United States Patent [19]

Southworth et al.

[11] 4,400,717
[45] Aug. 23, 1983

[54] COLOR SLOW-SCAN TV SYSTEM AND METHOD

[75] Inventors: Glen R. Southworth, Boulder; Larry R. McClelland; Bruce F. Johnson, both of Longmont, all of Colo.

[73] Assignee: Colorado Video Incorporated, Boulder, Colo.

[21] Appl. No.: 256,207

[22] Filed: Apr. 21, 1981

[51] Int. Cl.$^3$ .............................................. H04N 9/32
[52] U.S. Cl. ..................................... 358/13; 358/140; 358/141
[58] Field of Search ................. 358/12, 13, 21 R, 140, 358/141, 260

[56] References Cited

U.S. PATENT DOCUMENTS 4,057,836 11/1977 Munsey ................................ 358/140
4,210,927 7/1980 Yumde et al. ......................... 358/12

Primary Examiner—Richard Murray
Attorney, Agent, or Firm—O'Rourke & Harris

[57] ABSTRACT

A color slow-scan TV system and method are disclosed for selecting U.S. standard NTSC TV color pictures (or alternately other standards such as PAL or non-standard color TV) to be transmitted, transmitting the selected pictures utilizing slow-scan techniques, and reconstructing the pictures after transmission for display. The system includes a video compressor (transmitter) for receiving a composite video signal indicative of a color TV picture and providing therefrom a color slow-scan output signal indicative thereof, and a video expander (receiver) for receiving color slow-scan signals after transmission and providing therefrom a fast-scan output signal suitable for display of the color TV picture. The system and method include digitizing a selected video signal indicative of a TV color picture, writing the digitized information into a digital memory, reading out the memory through a digital-to-analog converter at a color slow-scan rate suitable for transmission on a transmission channel, receiving the transmitted color slow-scan signal and digitizing the received color slow-scan signal, writing the digitized color slow-scan information into a digital memory, and reading out the memory through a digital-to-analog converter at a fast-scan rate suitable for display on conventional color TV monitors using NTSC, PAL, or other standards.

75 Claims, 24 Drawing Figures

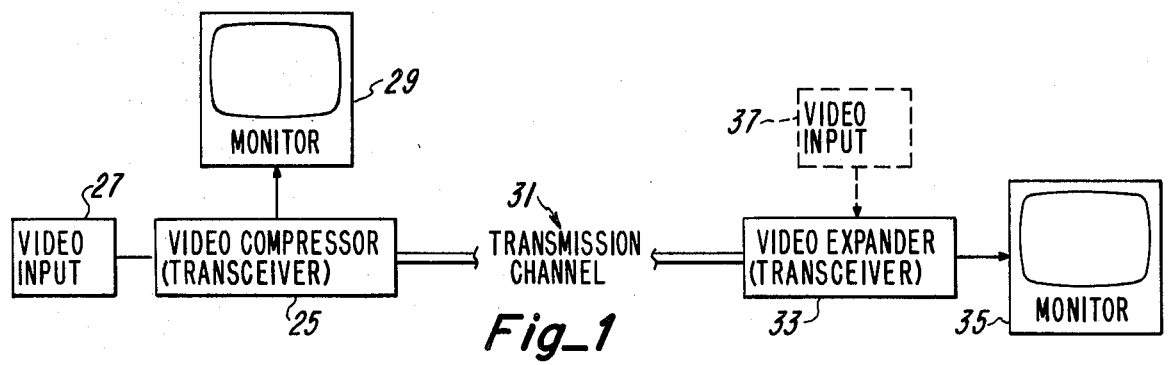
Fig_1
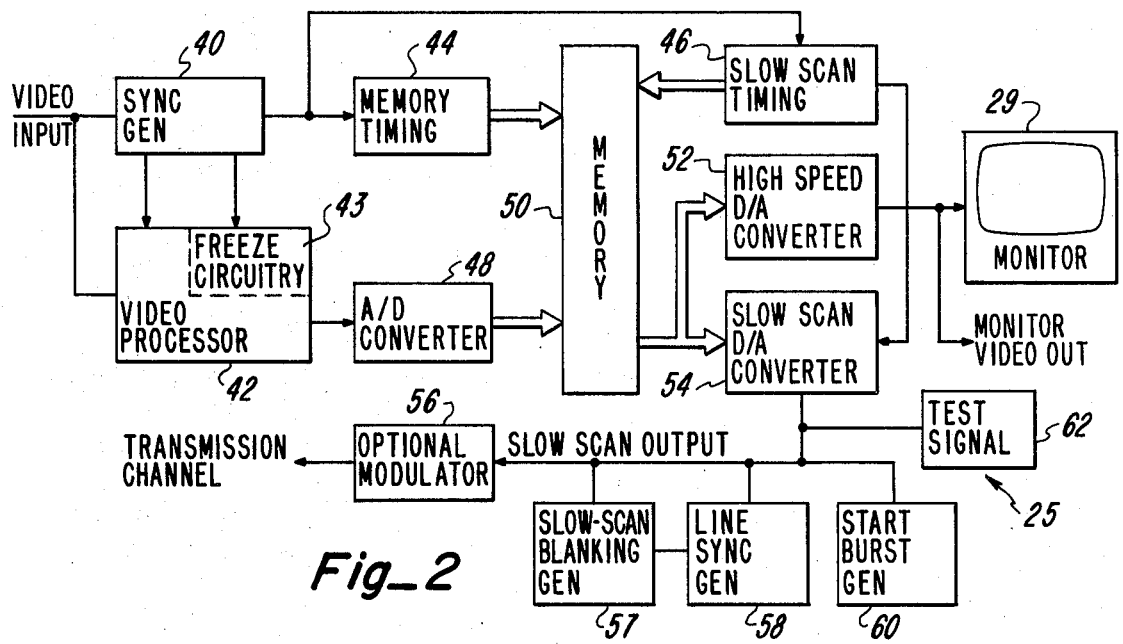
Fig_2
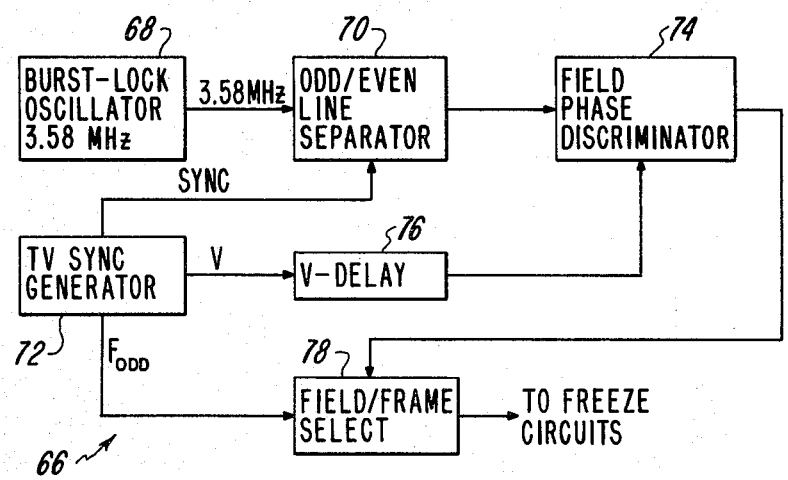
Fig_3

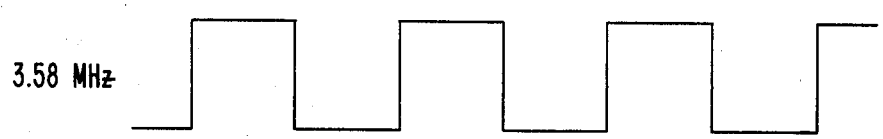
Fig_4A
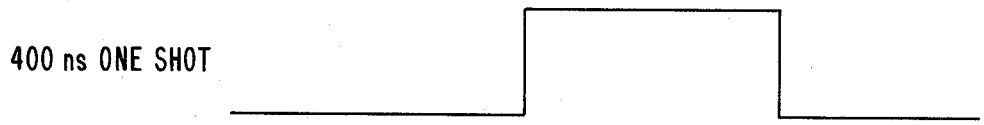
Fig_4B
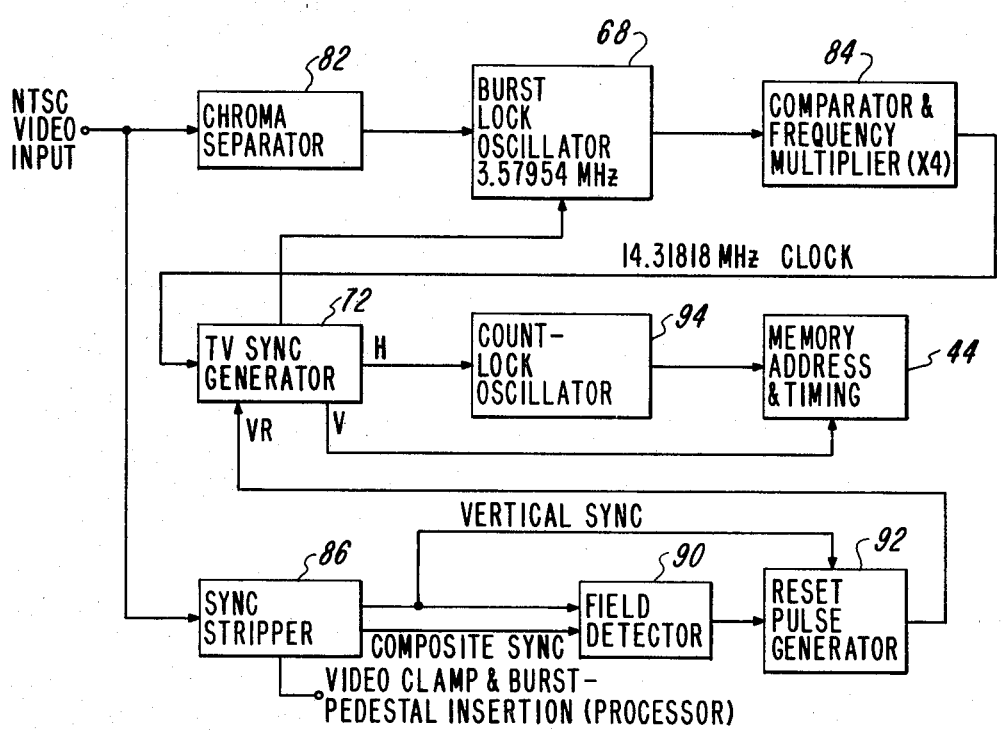
Fig_5
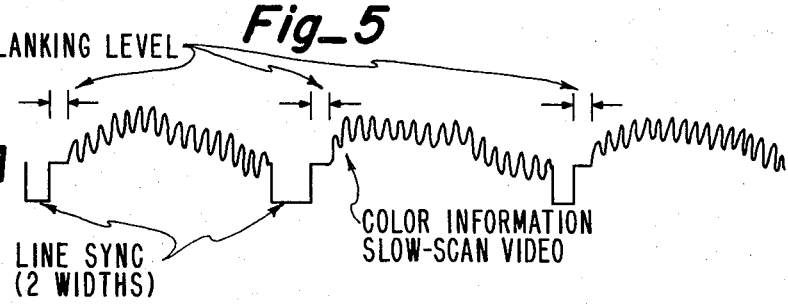
Fig_6A
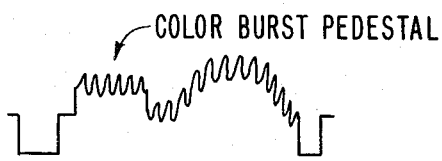
Fig_6B

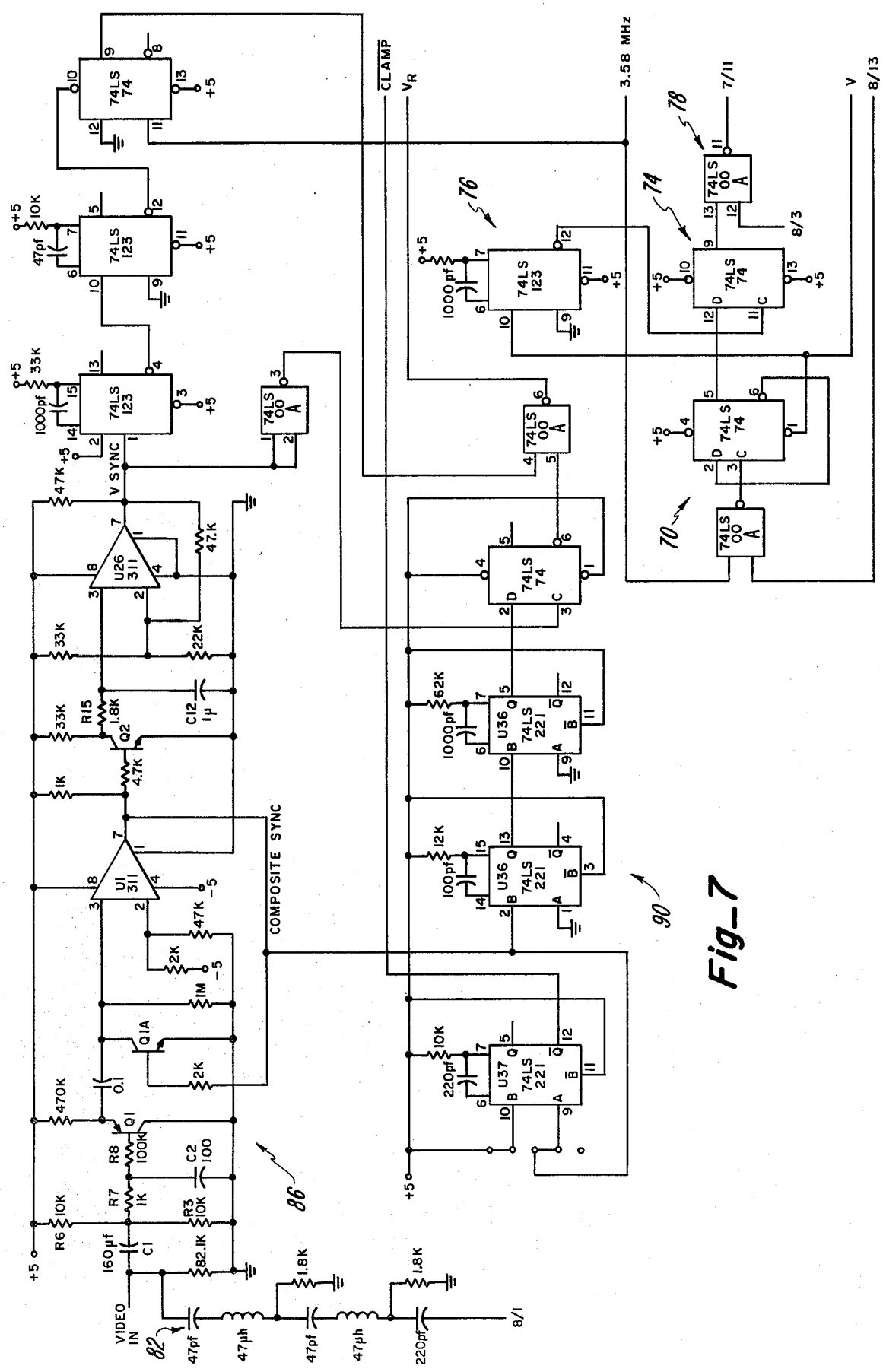
Fig_7

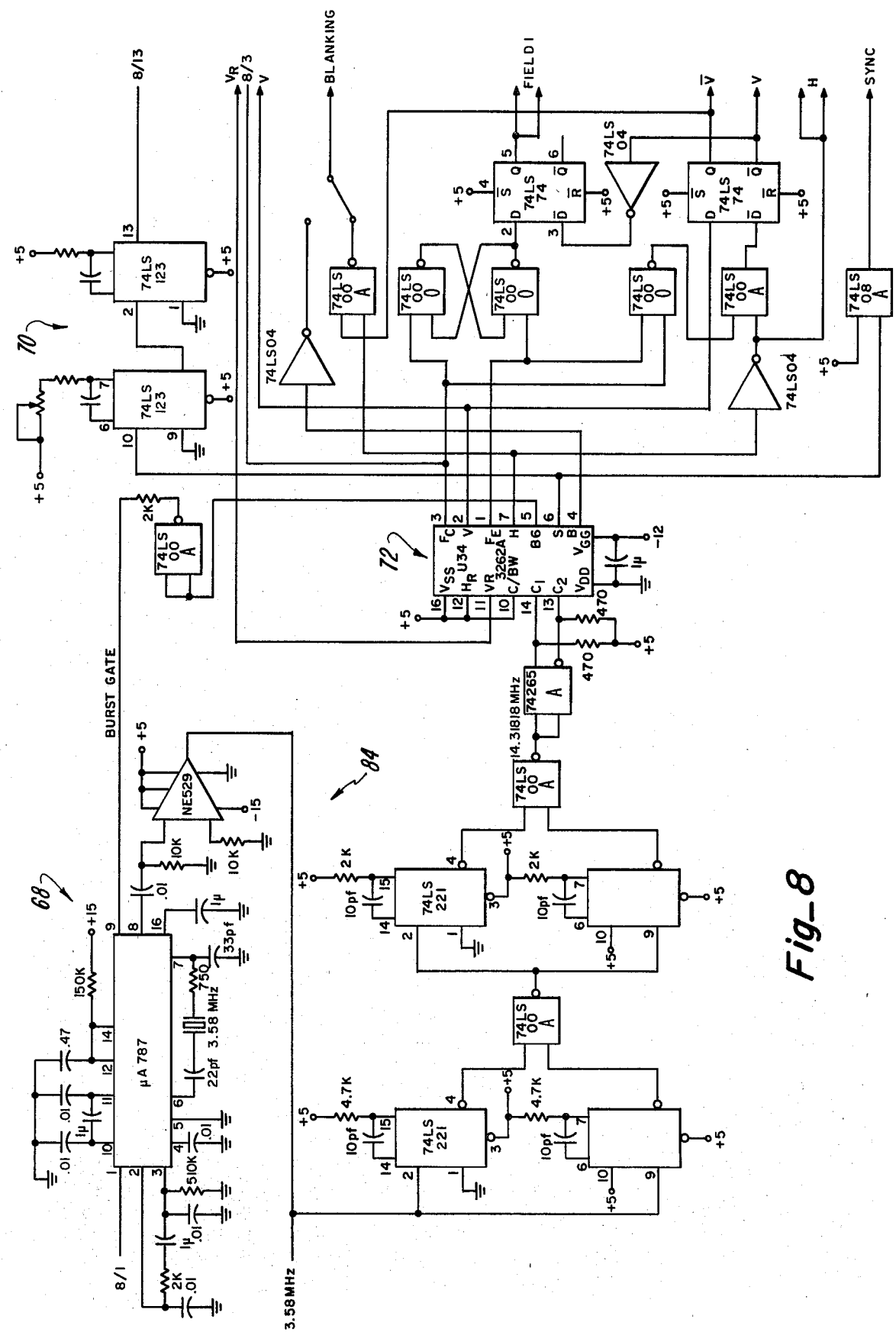
Fig_8

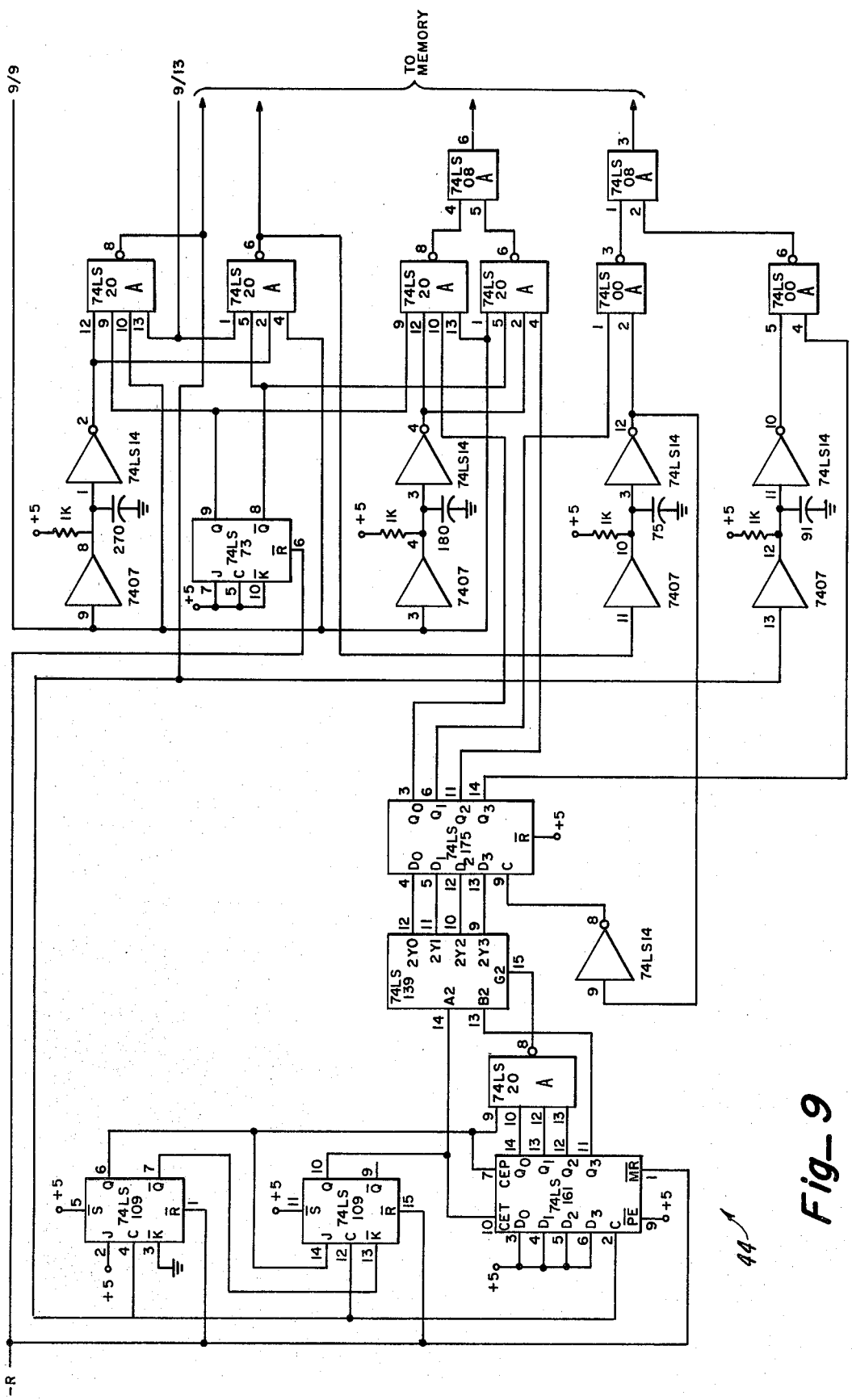
Fig_9

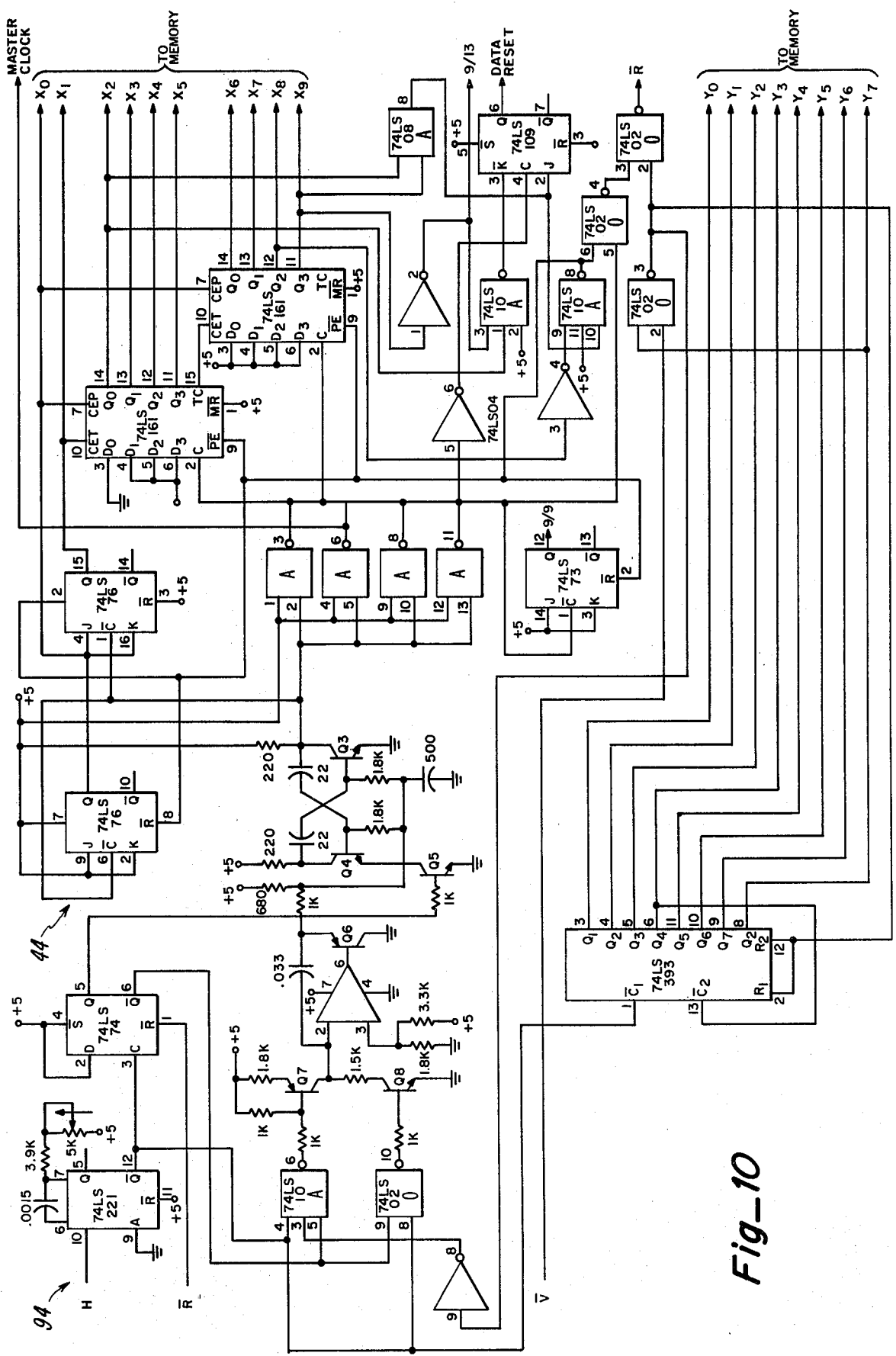
Fig_10

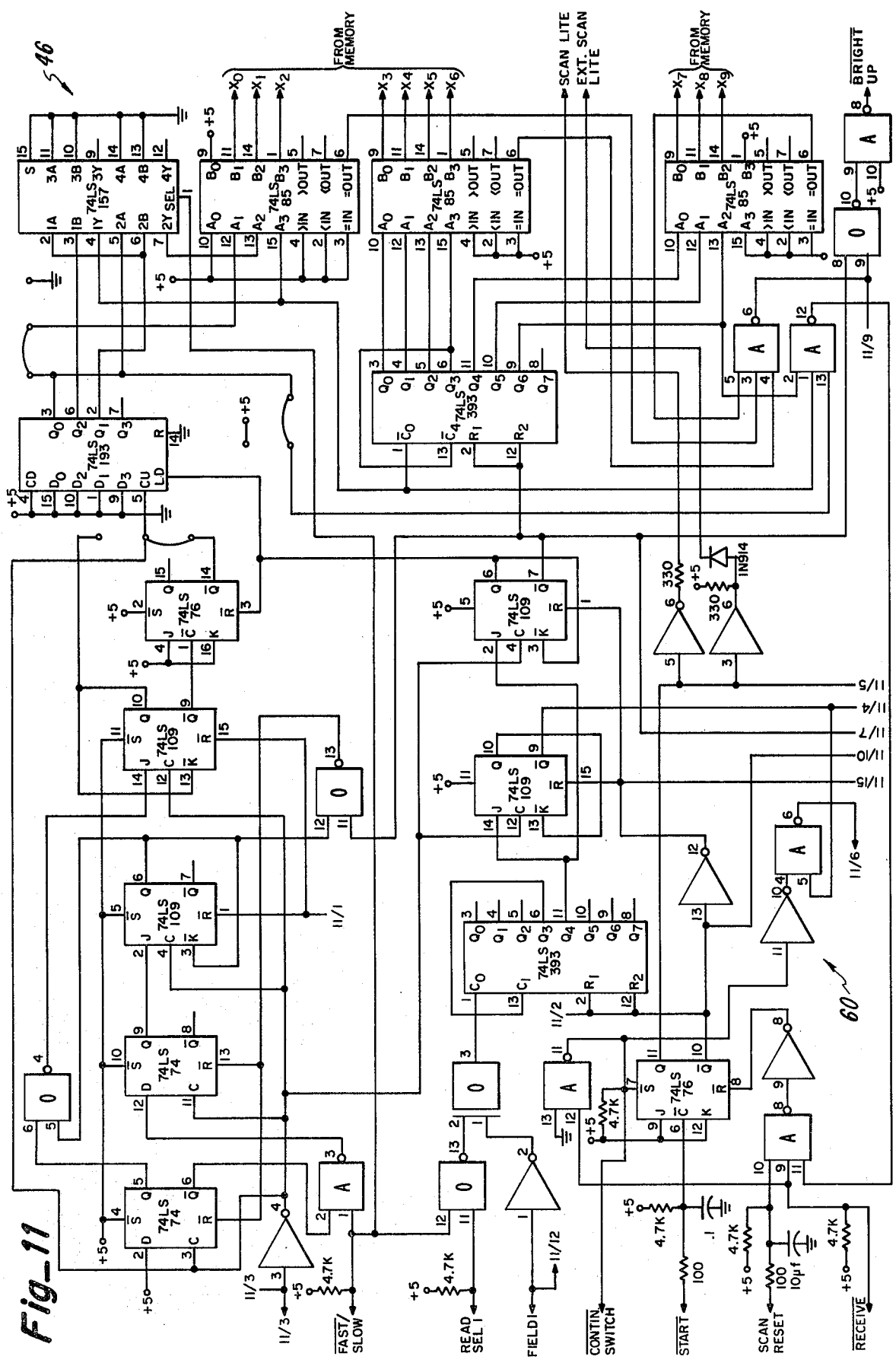

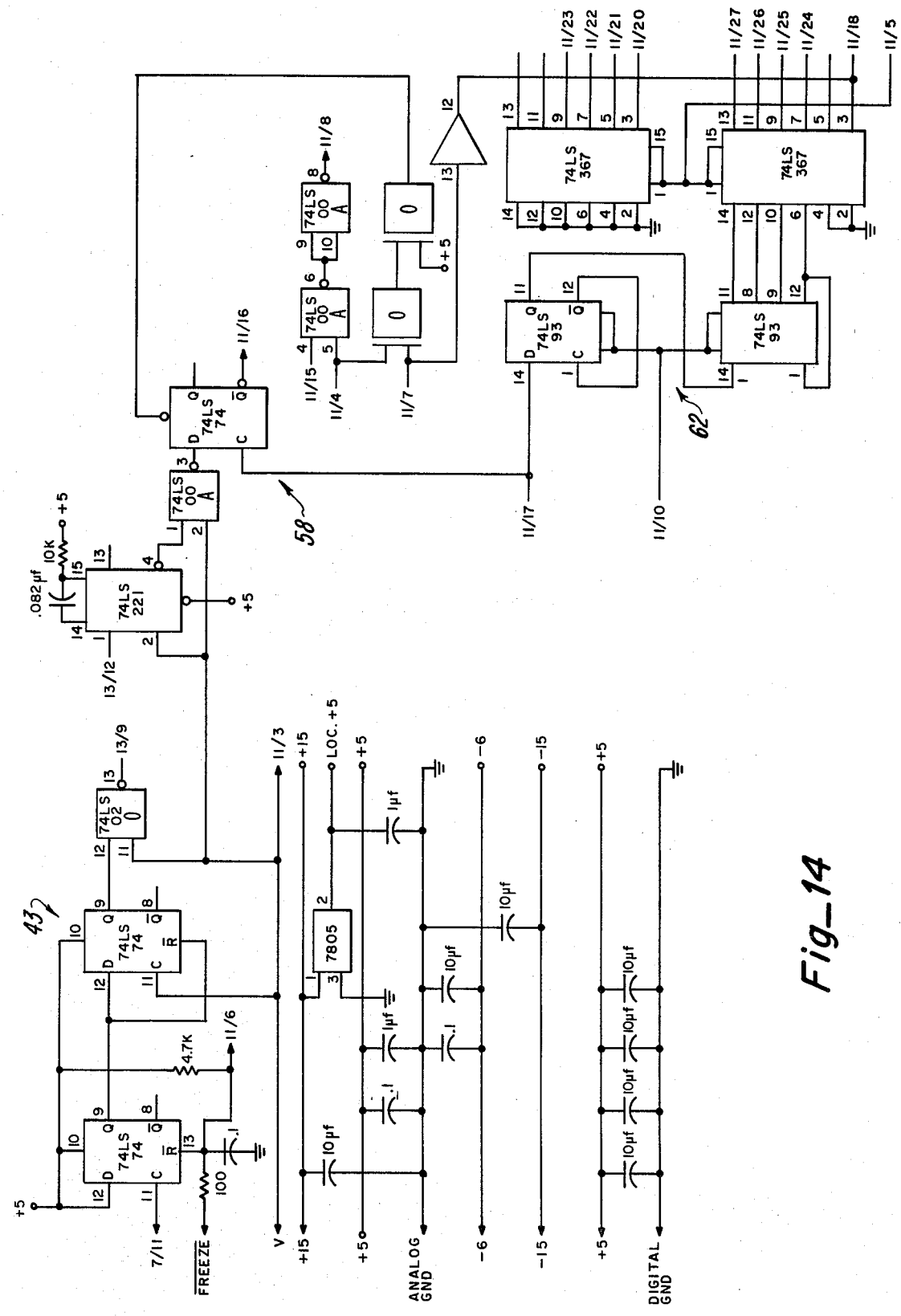
Fig_14

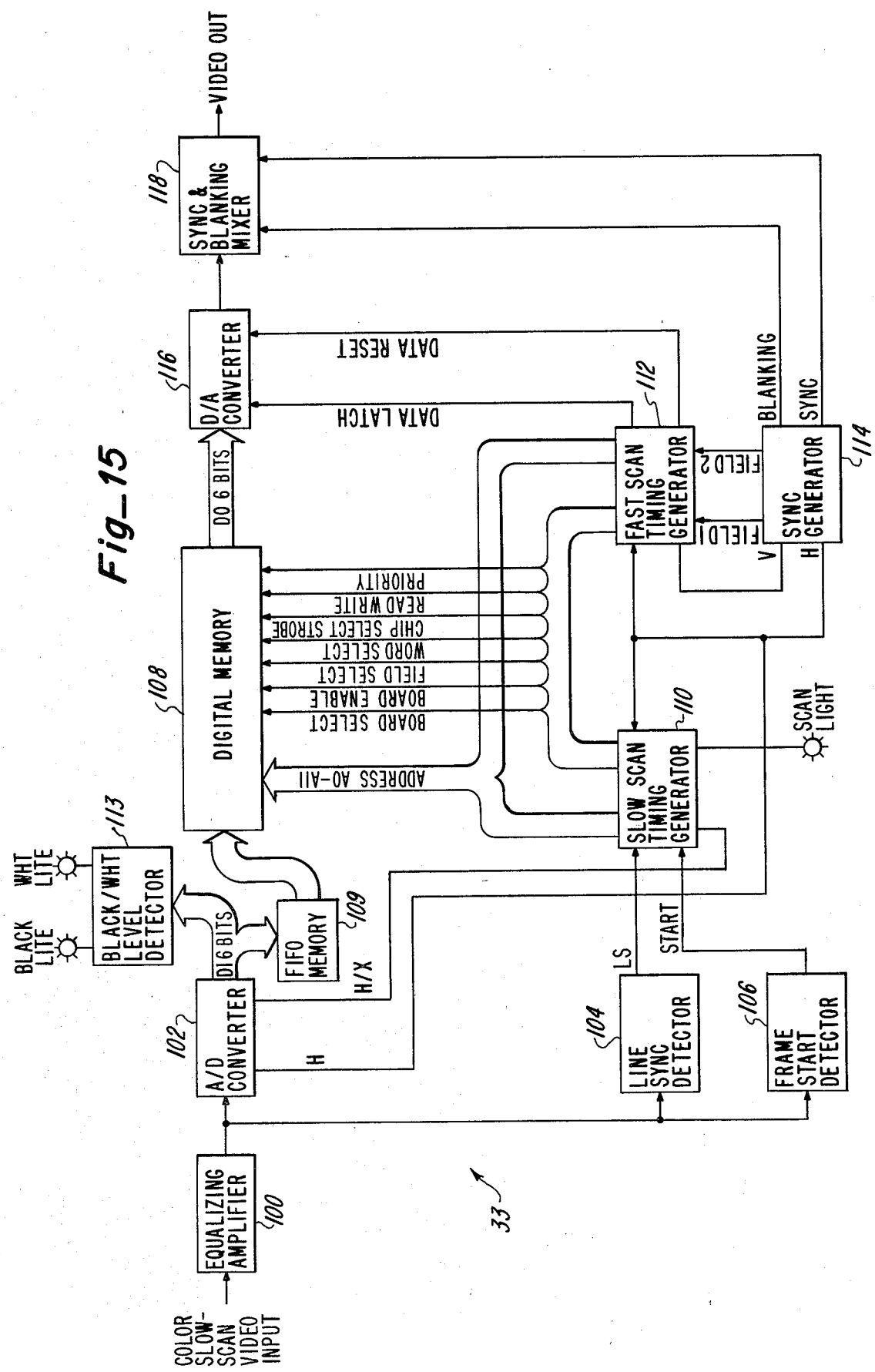
Fig_15

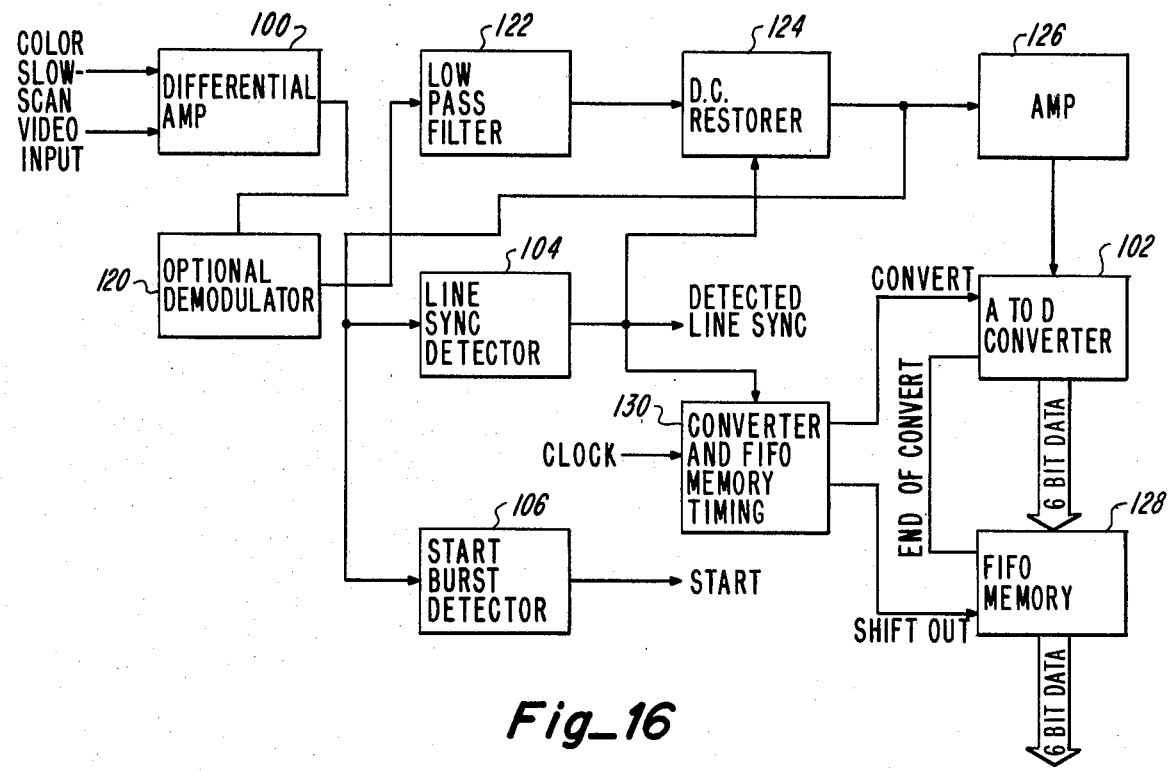
Fig_16
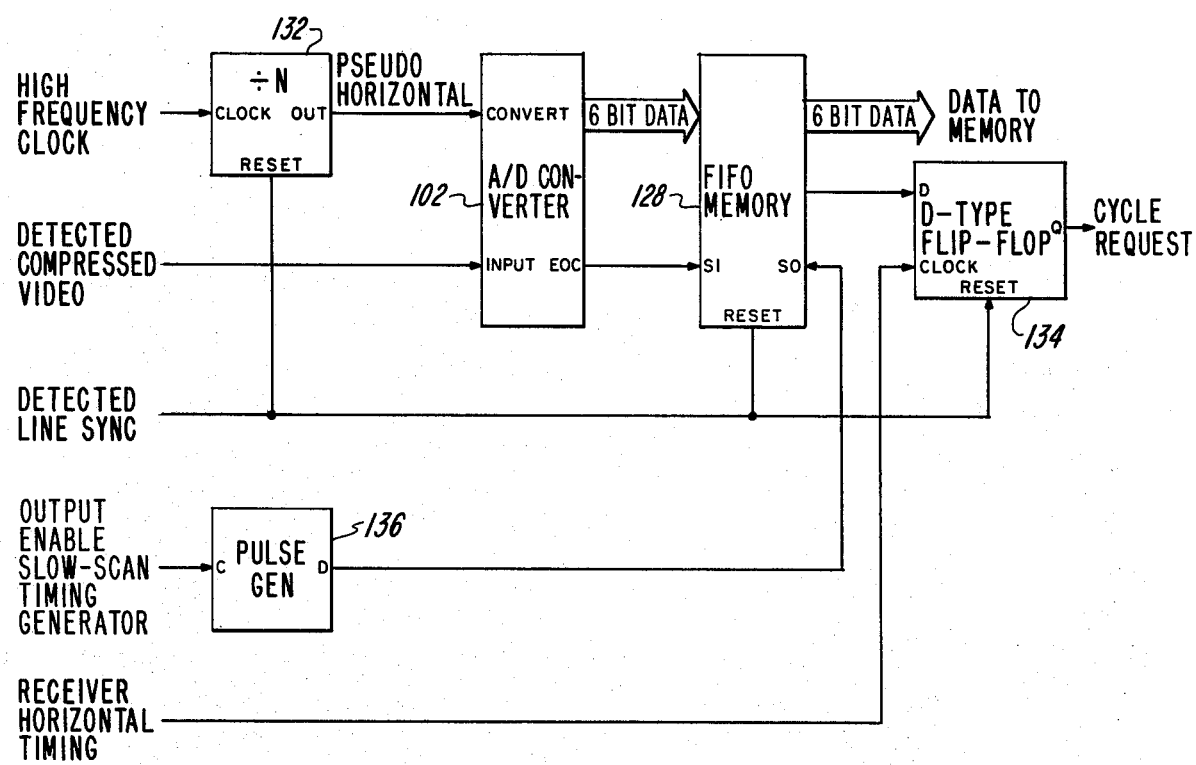
Fig_17

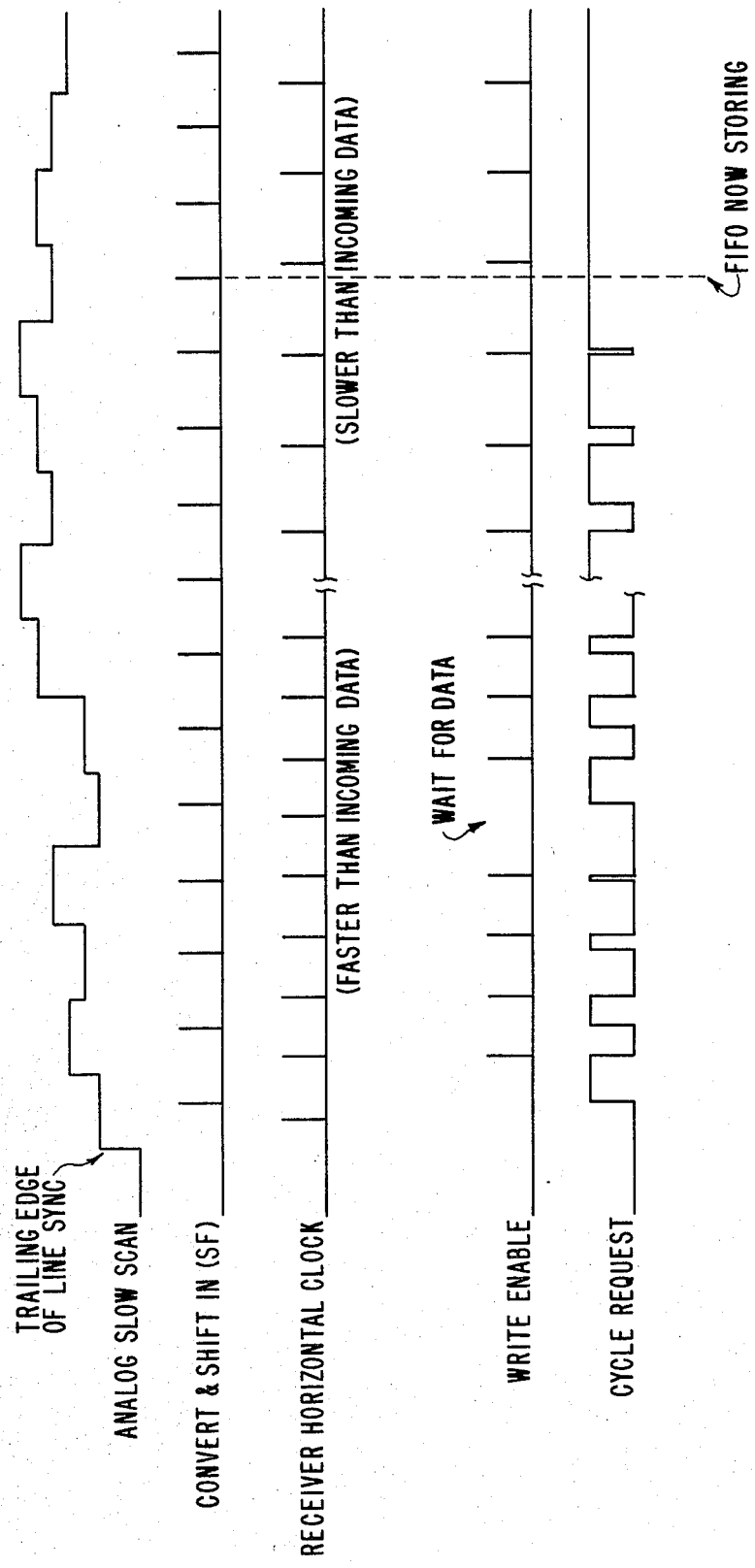
Fig_18

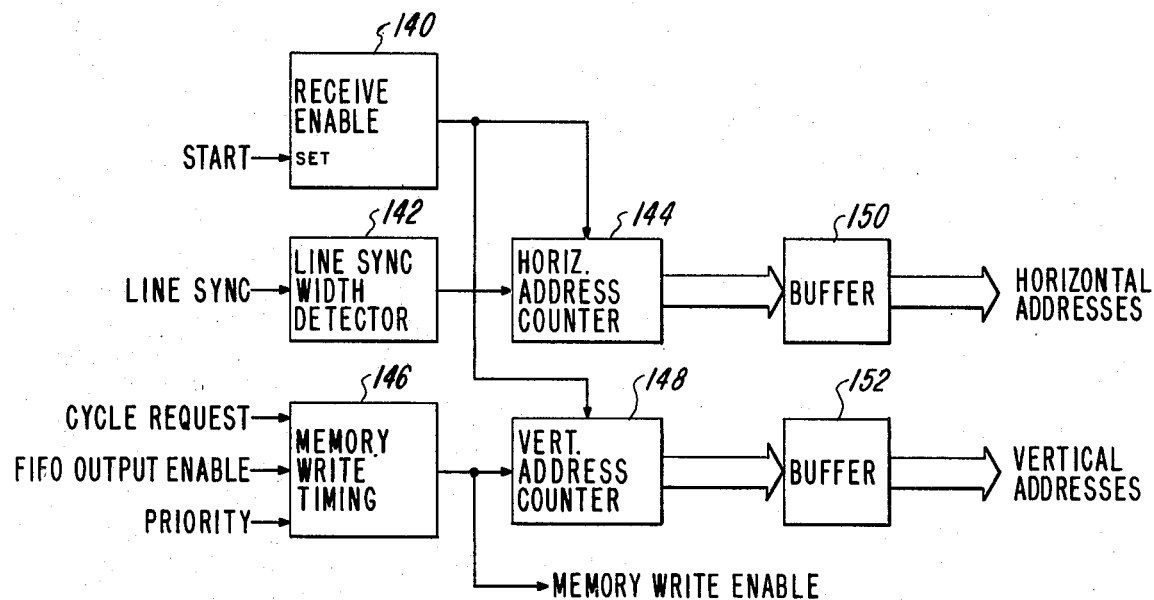
Fig_19
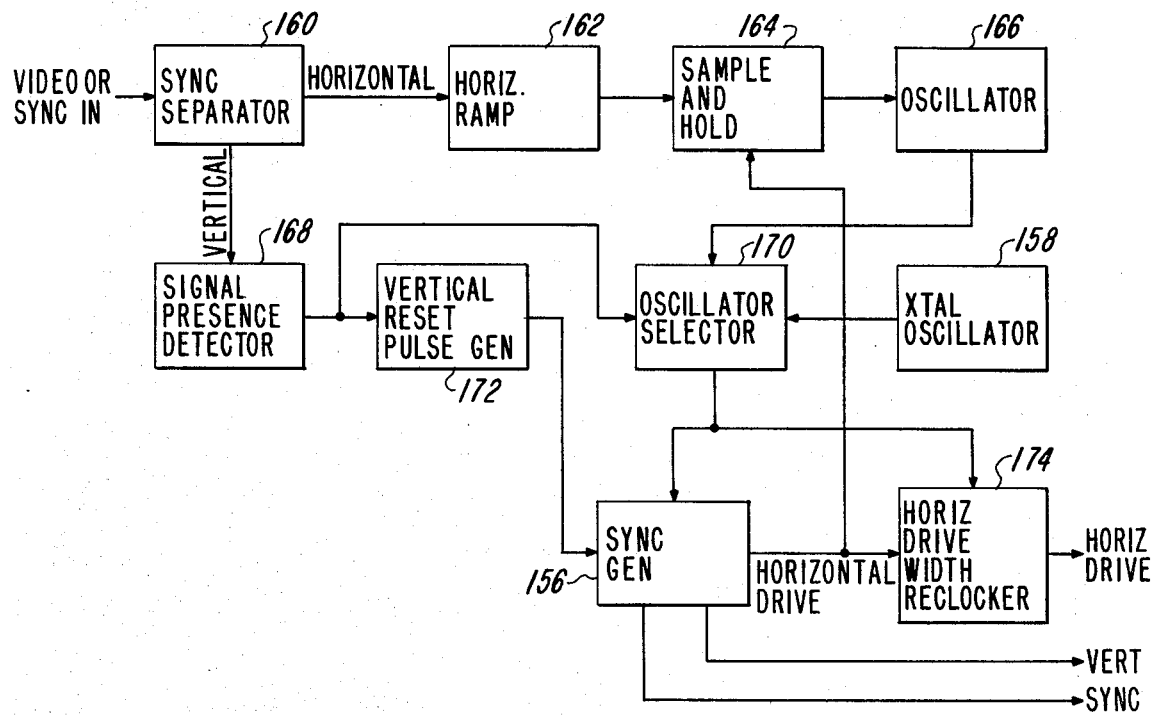
Fig_20

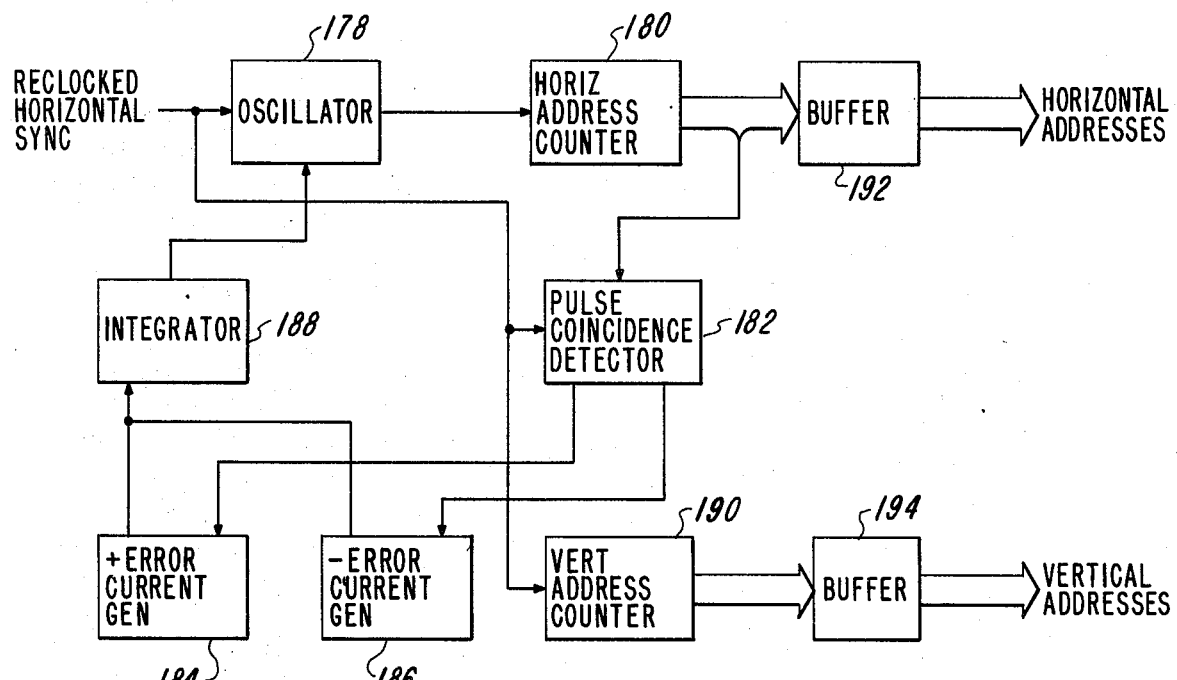
Fig_21
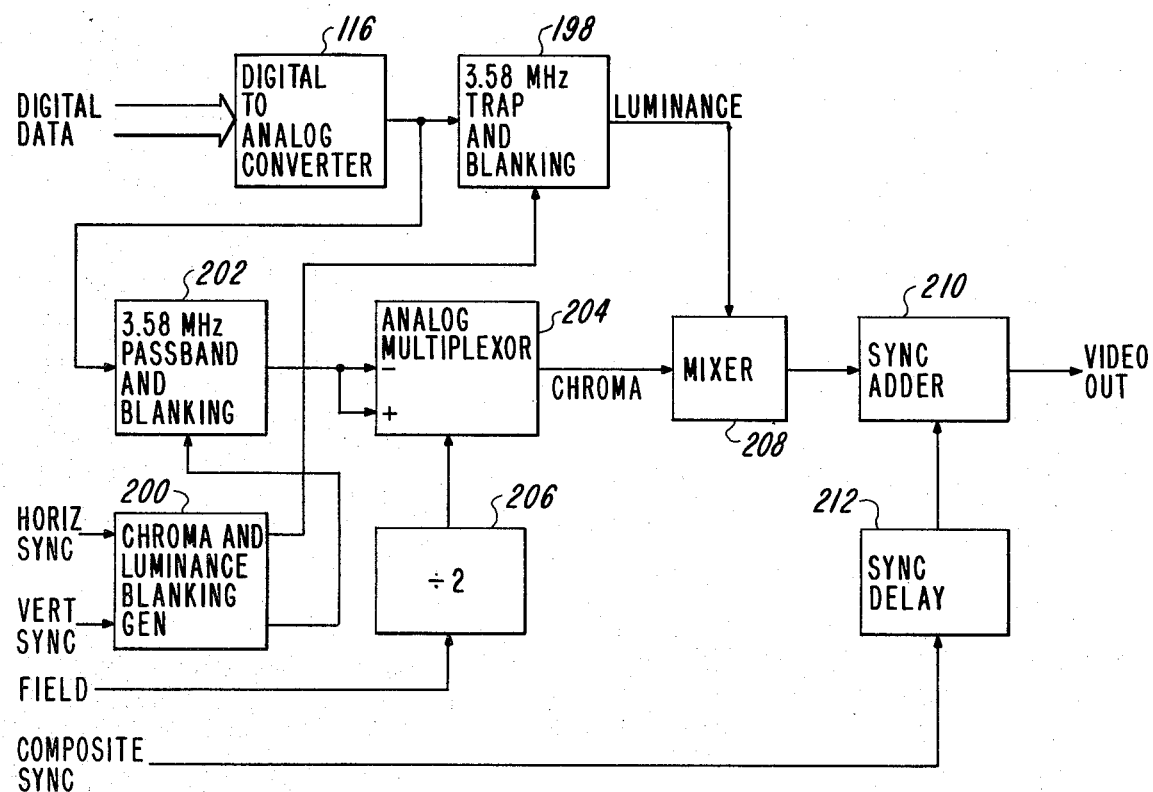
Fig_22

COLOR SLOW-SCAN TV SYSTEM AND METHOD

FIELD OF THE INVENTION

This invention relates to a TV transmitting and receiving system and method, and, more particularly, relates to a color slow-scan TV system and method.

BACKGROUND OF THE INVENTION

Various systems have been heretofore developed and/or utilized for transmitting both black-white and color TV pictures and receiving such transmitted pictures and displaying the same. In addition slow-scan techniques have been heretofore utilized to compress black and white pictures and then causing the compressed data to be transmitted over a transmission channel after which the black and white pictures were reconstructed from the transmitted data.

While color TV pictures utilizing slow-scan techniques have been utilized, such techniques have commonly included the use of digital transmission of encoded signals or have used separation of video signals into red, blue and green segments, or have separated the luminance and chrominance components.

SUMMARY OF THE INVENTION

This invention provides a system and method for transmitting and receiving color TV signals using slow-scan techniques.

The subject invention is considered to have merit in that it accepts standard encoded television signals and provides an efficient means of conversion to analog slow-scan TV for economical and effective transmission.

It is therefore an object of this invention to provide a color slow-scan TV system and method.

It is another object of this invention to provide a system and method for transmitting and receiving color TV signals using slow-scan techniques.

It is still another object of this invention to provide a slow-scan color TV system and method that accepts standard encoded television signals and provides an efficient means of conversion to analog slow-scan TV for economical and effective transmission.

With these and other objects in view, which will become apparent to one skilled in the art as the description proceeds, this invention resides in the novel construction, combination, arrangement of parts and method substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a block diagram of this invention illustrating use of the invention to transmit and receive color slow-scan TV signals;

FIG. 2 is a block diagram of the video compressor unit shown in FIG. 1;

FIG. 3 is a block diagram of the burst-phase discriminator portion of the sync generator shown in FIG. 2;

FIGS. 4A and 4B illustrate typical pulses produced in the odd/even line separator shown in FIG. 3;

FIG. 5 is a block diagram illustrating sychronization and frequency stabilization for memory timing of the video compressor unit shown in FIG. 2;

FIGS. 6A and B illustrate a typical color slow-scan video signal and the input color video signal with color burst pedestal added, respectively.

FIGS. 7 through 14 are schematic diagrams of the video compressor shown in block form in FIGS. 2, 3 and 5;

FIG. 15 is a block diagram of the video expander shown in FIG. 1;

FIG. 16 is an expanded block diagram of the front portion of the video expander shown at the left side of FIG. 15;

FIG. 17 is an illustrative block diagram relating to the portion of the video expander shown in FIG. 16;

FIG. 18 is a series of wave forms and pulses to illustrate operation of the device as shown in FIG. 17;

FIG. 19 is a block diagram of the slow-scan timing generator shown in FIG. 15;

FIG. 20 is a block diagram of the sync generator shown in FIG. 15;

FIG. 21 is a block diagram of the fast-scan timing generator shown in FIG. 15; and FIG. 22 is a block diagram of the digital-to-analog converter and sync and blanking mixer as shown in FIG. 15.

DESCRIPTION OF THE INVENTION

Figure 12:
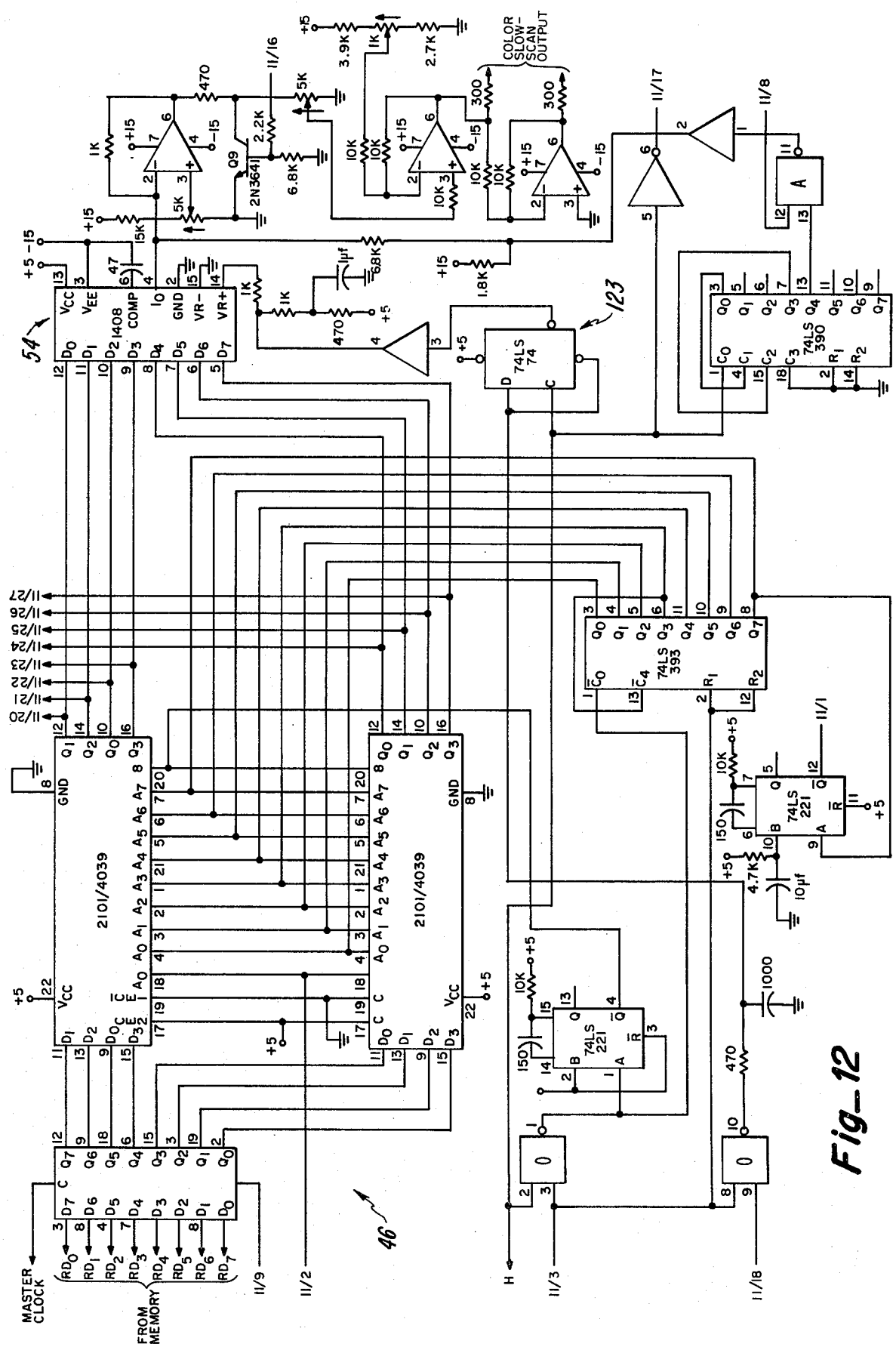

Referring now to the drawings, a system is shown for transmitting and receiving narrow-band video communications in color. As indicated in FIG. 1, the system includes a video compressor 25 which receives a conventional color television input signal from a video input 27, which input signal is digitized on command and fed to a solid state digital memory as brought out more fully hereinafter.

The output of the memory in video compressor 25 is displayed on a TV monitor 29 which indicates the image to be transmitted. Upon command, the memory is read out slowly and transmitted over a transmission channel 31 to a video expander 33 where the slow-scan color TV signal is translated to a single field or full frame NTSC (National Television Systems Committee) compatible format with the reconstructed TV still picture being displayed at TV monitor 35.

As indicated in FIG. 1, the transmission can be in both directions (rather than only from the compressor to the expander through the transmission channel) through use of a transceiver at both ends of the transmission line (with each transceiver including both a video compressor and a video expander) with, of course, a video input being necessarily providable to each transceiver (as indicated by video input 37 in dotted lines in FIG. 1).

In the system of this invention, many sending speeds can be utilized as, for example, with a 1.125 KHz bandwidth, 74 seconds for a single field picture with 512 times 256 elements, dot interlaced, or, with a 10 KHz bandwidth, 8.25 seconds for the same resolution. A full frame picture with 512 times 512 picture element resolution takes twice as long for the given bandwidths. The exact transmission speed depends upon the transmission channel to be used and on resolution of the digital memory. In addition, transmitting only portions of the picture can also be used to reduce transmission time and required memory size.

At the receiving end, image retention is indefinate unless deliberately erased or power to the unit is lost. The transmission channel can include, for example, a standard voice grade telephone line, a dedicated telephone line, a satellite channel, or a tape recorder.

Figure 13:
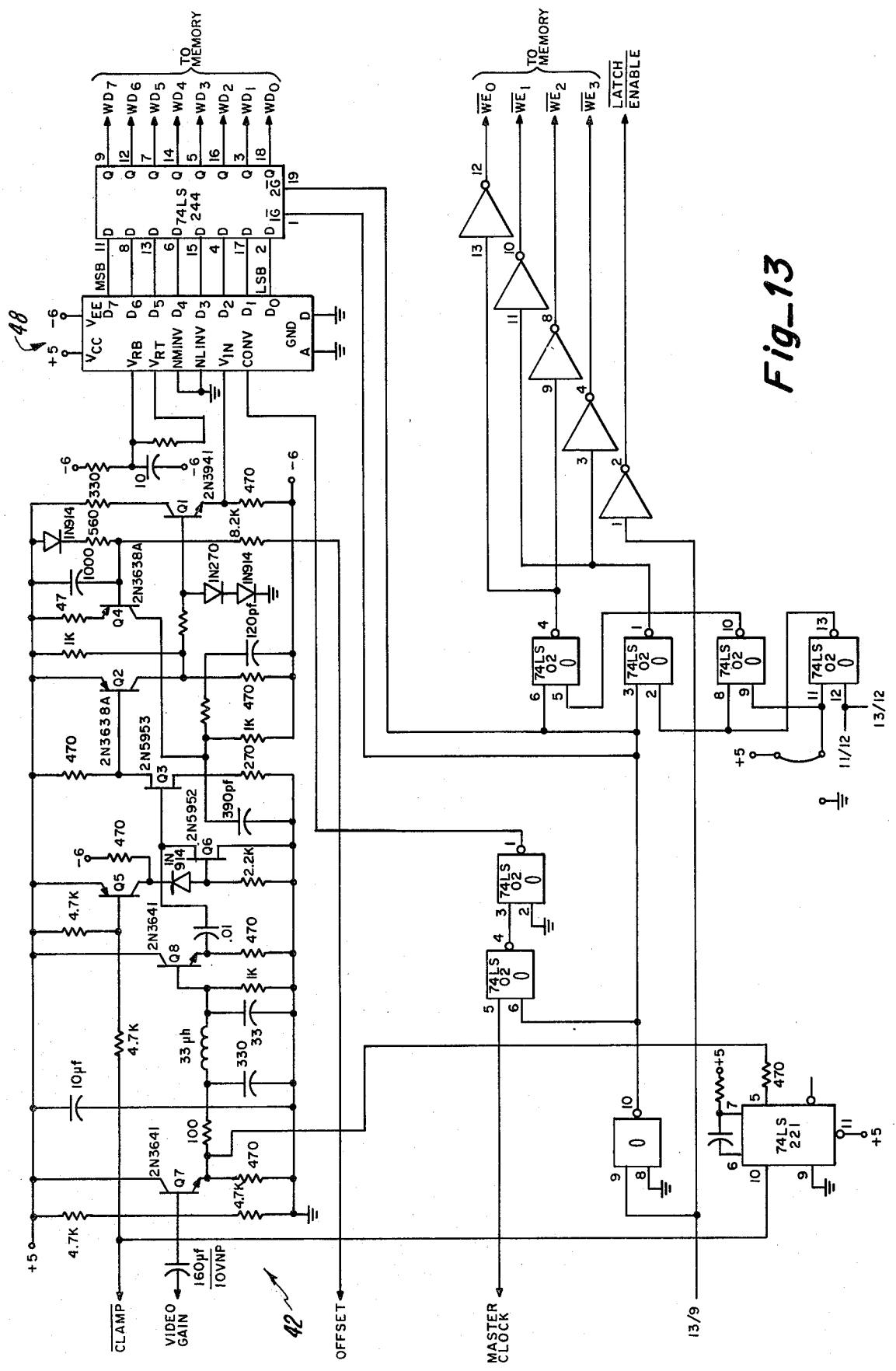

Video compressor 25 is shown in greater detail in the block diagram of FIG. 2. As shown, the color video input (from video input 27) is coupled to sync generating unit 40 and video processing unit 42. Sync generating unit 40 provides a clamp output and a freeze output both of which are coupled to video processor 42 with the freeze output being coupled to freeze circuitry 43 in video processor 42, as indicated in FIG. 2 (video processor 42 and freeze circuitry 43 are shown in greater detain in FIGS. 13 and 14, respectively, of the drawings). In addition, sync generating unit 42 also provides an output to memory timing unit 44 (which is shown in greater detail in FIGS. 9 and 10 of the drawings) and slow-scan timing unit 46 (which is shown in greater detail in FIGS. 11 and 12 of the drawings). The output from video processor 42 is coupled through analog-to-digital (A/D) converter 48 (which is shown in greater detail in FIG. 13 of the drawings) to memory 50 (which can be conventional), with memory 50 also receiving inputs from memory timing unit 44 and slow-scan timing unit 46.

The output from memory 50 is coupled through high speed digital-to-analog (D/A) converter 52 (which can be conventional) to provide a color TV picture at TV monitor 29, and through slow-scan digital-to-analog (D/A) converter 54 (which is shown in greater detail in FIG. 12 of the drawings) (and which converter also receives an input from slow-scan timing unit 46) to provide, upon command, a color slow-scan output to transmission channel 31, with the color slow-scan output being typically coupled to transmission channel 31 through an optional conventional modulator 56.

As also indicated in FIG. 2, the output line of slow-scan D/A converter 54 has also connected thereto the output of slow-scan blanking generator 57 (which is shown in greater detail in FIG. 14 of the drawings), line sync generator unit 58 (which is shown in greater detain in FIG. 14 of the drawings), and start burst generator 60 (which is shown in greater detail in FIG. 11 of the drawings). In addition, a test signal can also be provided on the output line of slow-scan D/A converter 54 by test signal generating unit 62 (which is shown in greater detail in FIG. 14 of the drawings).

It is mandatory to freeze the identical field of a frame pair in order to maintain color coherence between successive color slow-scan transmissions. The basis for this necessity is that the 3.57954 MHz (hereinafter at least sometimes referred to as 3.58 MHz for convenience) color burst phase alternates from line to line, there is an odd number of lines in a NTSC frame, and there are 262½ lines per field. From this, it can be determined that the characteristics of a field of NTSC color are identical only once in every four successive fields. In addition, if non-synchronized NTSC sources are input to the system, then some means of field identification is necessary.

Color-burst discrimination is accomplished by the system of this invention by burst-phase discriminator 66, shown in block form in FIG. 3 (discriminator 66 is a part of sync generating unit 40 as shown in FIG. 2). As shown, discriminator 66 includes a burst-locked oscillator 68 (which is implemented by a uA 787 integrated circuit and associated components as shown in the schematic diagram of FIG. 8). One of the functions of oscillator 68 is to provide a phase-locked oscillation signal at the burst frequency (a 3.58 MHz signal that is phase-locked to the NTSC video source), which output signal is coupled to odd/even line separator 70, which separator also receives a sync input from TV sync generator 72 to key on burst-locked oscillator 68 at the color burst time. TV sync generator 72 includes a 3262A integrated circuit (U38) as shown in the schematic diagram of FIG. 8.

Odd/even line separator 70 includes two one-shot multivibrators (74LS123) as shown in FIG. 8, and a NAND gate (74LS00) and a "D" type flip-flop (74LS74) as shown in FIG. 7. TV sync (from TV sync generator 72) is coupled to pin 10 of one adjustable one shot multivibrator of odd/even line separator 70 (as shown in FIG. 8) in order to position the pulse of the second one-shot multivibrator of odd/even line separator 70 around the 3.58 MHz square wave input to the separator 70.

The timing components of the second one-shot multivibrator are chosen to be 400 nanoseconds with the relative positioning of the input signals to separator 70 being shown in FIGS. 4A and B. The NAND gate of separator 70 "AND'S" the 3.58 MHz square wave with the one-shot pulse and produces two pulses for an even phase line or one pulse for an odd phase line. The output of the NAND gate of separator 70 is counted by the "D" type flip-flop of the separator with the output therefrom during the lines being stable and alternating from high to low with pairs of odd and even lines.

Odd/even line separator 70 thus examines the phase of the 3.58 MHz signal (from burst-locked oscillator 68) during each line and provides field-phase discriminator 74 with this information. Field phase discriminator 74 is a one-shot multivibrator (74LS74 as shown in FIG. 7), and receives a second input from vertical delay 76, which delay is also a one-shot multivibrator (74LS123 as shown in FIG. 7). V delay one-shot 76 is triggered by vertical drive and its timing components are chosen to provide an edge which occurs during the third line after vertical drive. "D" type flip-flop 74 is clocked by this edge and its output state is determined by the state of odd/even line separator 70. The sequence of the output of flip-flop 74 is: low for frame 1 odd field; high for frame 1 even field; high for frame 2 odd field; and low for frame 2 even field.

Field-phase discriminator 74 provides an output to field/frame select 78, which is a NAND gate (74LS00 as shown in FIG. 7), which gate receives the odd field pulse from TV sync generator 72 as a second input. The output of gate 78 is low for one field in four and is dependent upon the burst phase and the odd/even frame sequence of the NTSC video source. As indicated in FIG. 3, the output of field/frame select (gate 78) is coupled to the freeze circuitry 43 of video processor 42.

In order to preserve the color content of a video picture conforming to the National Television System Committee (NTSC) of the Electronics Industries Association, the phase angle of the color subcarrier (3.57954 MHz) must be measured accurately within a TV line, from line to line, and from frame to frame. This is accomplished in the system of this invention with the critical synchronization and frequency stabilization for memory timing shown in the block diagram of FIG. 5. The circuitry included in the block (which is shown in schematic form in FIGS. 7, 8, 9 and 10) accomplishes the necessary timing so that the video signal is sampled with a resolution consistent with the memory size, stored in a digital memory, and maintained with the necessary stability required to preserve the color content of the NTSC video.

Referring now to the block diagram of FIG. 5, burst-locked oscillator 68 and TV sync generator 72 have been set forth as a part of this block diagram to better illustrate the invention. As shown in the schematic diagrams of FIGS. 7 and 8, these are the same components as explained hereinabove with respect to the burst-phase discriminator 66.

As shown in FIG. 5, the video input signal is coupled through chroma separator 82 to burst-locked oscillator 68 with chroma separation being accomplished in chroma separator 82 by passing the video signals through two passive series tuned circuits (as shown in FIG. 7) whose resonant frequency is chosen to be 3.58 MHz. The input video is thus examined for its color-burst frequency (3.58 MHz) by chroma separator 82 and crystal oscillator 68 (burst-locked oscillator) is phased-locked to this frequency.

The output frequency (3.57954 MHz) from burst-locked oscillator 68 is then multiplied by four in comparator and frequency multiplier 84 to obtain a precise frequency of 14.31818 MHz, which signal is used as a clock signal for TV sync generator 72, the phase and frequency of which is dependent upon the external NTSC video source.

As shown in FIG. 8, the output of oscillator 68 is coupled to a voltage comparator (NE529), which provides a TTL compatible square wave at 3.57954 MHz. This signal is coupled to two one-shot multivibrators (74LS221). The one-shot wiring and timing components are chosen to provide 60 nanosecond pulses at each edge of the input signal. The outputs from the multivibrator are OR'd in a NAND gate (74LS00) to produce a 7.159 MHz pulse train which is coupled to two additional one-shot multivibrators (74LS221). The wiring and components of these multivibrators are selected to provide 30 nanosecond pulses at each edge of the input signal. The outputs are OR'ed in a NAND gate (74LS00) to produce a 14.31818 MHz output pulse train which is coupled as the clock signal through a 74265 symmetrical output NAND gate to TV sync generator 72.

The external video is also examined for its sync pulse content by sync stripper 86, which provides the necessary synchronization information so that the sync generator is locked to the exact field of the external video signal. The NTSC video signal is coupled to sync stripper 86 through capacitor C1 (as shown in FIG. 7) and applied to a bias and chroma attenuator network (R3, R6, R7, R8, and C2 as shown in FIG. 7) and buffered by buffer Q1 (as shown in FIG. 7). The signal is then clamped and sliced by amplifier Q1A and comparator U1 and associated components (as shown in FIG. 7). The output of comparator U1 is composite sync which is coupled to transistor Q2, which along with R15, C12, and associated components buffer and supply the input to comparator U26, the vertical sync stripper. The output of comparator U26 is vertical sync which is coupled to field detector 90 and reset pulse generator 92.

Sync stripper 86 also provides a back-porch clamp pulse to video processor 42. This clamp pulse is coupled to a one-shot multivibrator U37 (74LS$_{221}$ as shown in FIG. 7) which provides a color-burst pedestal signal as shown in FIG. 6B to ensure that all the burst information is captured by the video A/D converter 48 (FIG. 2). Another method is to use the A/D converter to store the entire video signal to store all chroma information below blanking.

The composite sync output of sync stripper 86 is coupled to field detector 90 as shown in FIG. 5 (as well to one-shot multivibrator U37 as shown in FIG. 7). More particularly, as shown in FIG. 7, the composite sync output is coupled from comparator U1 of sync stripper 86 to one-shot multivibrator U37 to provide the clamp pulse necessary for the analog circuits associated with the video analog-to-digital converter, and to one-shot multivibrator U36 of field detector 90. The one-shot multivibrators are selected so that the output of one-shot multivibrator U36 is a pulse whose duration is 35 microseconds (just over ½ line duration). This signal is the "D" input to a "D" type flip-flop (74LS74). This flip-flop is clocked by the vertical sync output of comparator U26 (of sync stripper 86). If the vertical sync occurs on a half-line, the field is even and the flip-flop output will be low. If the field is odd the output will be high.

Stripped vertical sync (from comparator U26 of sync stripper 86) is also coupled to two one-shot multivibrators (74LS123 of reset pulse generator 92) the components of which are chosen to provide a pulse at 29 microseconds after the occurance of stripped vertical sync. This pulse sets a flip-flop (74LS74) the output (VR) of which is clocked low by the next 3.58 MHz clock pulse. This output is AND'ed with the output of field detector 90 and provides a reset to TV sync 72 once a frame at the odd field time.

TV sync generator 72 receives the 14.31818 MHz clock input from frequency multiplier 84 that is phase-locked to the incoming NTSC color sub-carrier. The reset pulse assures that the proper field is synchronized and proper H (15,734 Hz) and V (59.94 Hz) are coupled to the digital memory and timing circuits.

The horizontal (H) output signal from TV sync generator 72 is coupled to count-locked oscillator 94 (which is shown in greater detail in FIG. 10 of the drawings), the output of which is coupled to memory address and timing circuit 44. This oscillator provides the correct number of master clock pulses necessary to run the memory address counters and the A/D converter (FIG. 2) so that the proper number of digital samples consistent with the memory size occur for each horizontal line of the NTSC input video. These samples must start at the exact position and the same interval after each horizontal sync pulse.

Memory timing circuit 44 is driven by sync generator 40 output. This timing circuit generates a high speed clock from which the horizontal addresses are generated by counters. The counters are adjusted to provide proper addressing for the horizontal size (number of picture elements) of memory 50. The vertical address to the memory are counted from the vertical sync portion of sync generator 40 output.

A/D converter 48 provides the digitized video to memory 50 at a rate consistent with the frequency of the incoming video and the horizontal size of memory 50.

To convert the stored image to color slow-scan, slow-scan timing 46 creates read out of memory 50 addresses. These addresses are generated orthogonally (top to bottom in reference to the picture). The clock signal which generates these vertical addresses is either derived from horizontal sync or some other clock source referenced to sync generator 40. The speed at which the vertical addresses are generated sets the frequency of the color slow-scan signal, so that it may be varied to match the transmission channel over which it is to be used.

When a complete line (top to bottom) of vertical addresses are completed, the horizontal address is incremented and the vertical address counters start over.

By selecting the addresses (both horizontal and vertical) generated, selectable portions of the picture may be converted to color slow-scan signals in the interest of speeding up transmission time.

At completion of the horizontal addresses, slow-scan timing 46 resets and waits for initiation of the next color slow-scan picture transmission.

When each address is generated, slow-scan D/A converter 54 converts the digital information stored in memory 50 to an analog voltage, thus generating a color slow-scan analog TV signal. To this signal, start burst gen 60 adds a 787 Hz tone (derived by dividing horizontal sync by 20) at start of transmission to signal the video expander 33 (color slow-scan receiver) to start receiving the signal. Test signal circuit 62 generates a calibration signal that matches the color slow-scan frequency and amplitude between picture transmissions to facilitate calibration of the video expander 33 to the transmission channel.

Line sync gen 58 inserts a sync pulse in the color slow-scan signal at start of vertical addressing to phase-up vertical addressing of video expander 33. This line sync signal is coded with two alternating pulse widths to improve noise immunity and horizontal address generation accuracy by video expander 33.

Line sync gen 58 output is fed to slow-scan blanking generator 57 to create a small blanking interval between the line sync pulse and video portion of the color slow-scan signal as shown in FIG. 6A. This blanking interval is necessary to preserve a consistent rise time on the trailing edge of the sync pulse. This rise time could vary by picture content and transmission channel characteristics if the blanking interval is not present. A consistent rise time on the trailing edge of line sync is important to the timing of video expander 33.

The color slow-scan signal is now fed to optional modulator 56 to make the color slow-scan signal compatible to the type of transmission channel used. Examples of the type of modulators that could be used are frequency modulation, single sideband, etc.

High speed D/A converter 52 converts the digital information stored in memory 50 to an analog video signal suitable for displaying on TV monitor 29. This is for display of the image in the memory for preview purposes prior to transmitting the picture.

Referring now to video expander 33, which is shown generally in block form in FIG. 15, the color slow-scan input signal is coupled through equalizing amplifier 100 to A/D converter 102, line sync detector 104 and frame start detector 106. A/D converter 102 provides a six bit output to digital memory 108 through the FIFO memory 109. Memory 108 also receives inputs from slow-scan timing generator 110 and fast scan timing generator 112. As indicated in FIG. 15, the output of A/D converter 102 can also be utilized to indicate the presence of black and white light through the use of a black/white detector 113.

Slow-scan timing generator 110 receives line sync (LS), start, and horizontal (H) sync signals from line sync generator 104, frame start detector 106 and sync generator 114, respectively, while fast-scan timing generator 112 receives field, horizontal and vertical sync inputs from sync generator 114 (horizontal sync being also coupled to A/D converter 102 as shown in FIG. 15) and provides data latch and data reset outputs to D/A converter 116. As indicated in FIG. 15, a scan light can also be utilized to indicate scanning in progress. In addition, slow-scan timing generator 110 provides an output H/X to A/D converter 102 where X is set up to match the incoming color slow-scan video input.

D/A converter 116 receives the six bit output from digital memory 108 with the output from D/A converter 116 being coupled through sync and blanking mixer 118 (which receives sync and blanking inputs from sync generator 114) to provide the video output signal for display at video monitor 35.

A block diagram of a portion of video expander 33 is shown in FIG. 16. As shown, the incoming color slow-scan signal is coupled into differential (equalizing) amplifier 100. The output from amplifier 100 is then coupled to optional demodulator 120 (matching the optional modulator in the transmitter) and then processed through two active low pass filters 122 which remove any noise above the color slow-scan spectrum caused by the transmission path.

The output signal from filters 122 is then coupled through DC restorer 124 to line sync detector 104. Detector 104 very accurately reproduces line sync pulses contained in the incoming color slow scan signal without variations in timing due to the video information.

As brought out hereinabove, the transmitter is especially designed to insert a blanking level (by slow-scan blanking generator 123 as indicated in FIG. 11) immediately following line sync to avoid rise time problems caused by the transmission path due to variations in the video information amplitude immediately following the line sync pulse.

The filtered color slow-scan signal from low pass filter 122 has the DC reference level of the color slow-scan signal restored at DC restorer 124, which uses the detected line sync pulse from line sync detector 104 for this purpose. This allows the use of AC coupled transmission paths which would otherwise remove the black and white luminance reference levels.

The filtered color slow-scan signal is also coupled to start-burst detector 106 to detect the start burst. This is a tone of 787 Hz (derived by dividing the horizontal sync frequency by 20). The start-burst frequency detector must be set up so that its release time after the end of the start burst is quick enough to ensure that the first line sync pulse is detected (if this release time varied so that a line sync was missed, the color of the previously written picture could be shifted in hue).

The filtered color slow-scan signal is also coupled to amplifier 126 which tailors the video portion of the color slow-scan signal to the input specifications of analog-to-digital (A/D) converter 102, which converter provides a six bit output to FIFO memory 128, which, in turn, provides a six bit data output signal (to digital memory 108 as indicated in FIG. 15).

By generating a psuedo asynchronous sampling (convert) command (from converter and FIFO memory timing unit 130), the receiver is allowed to use a different sync source than the transmitter. For illustration, a simplified block diagram is set forth in FIG. 17 in conjunction with timewise related wave forms and pulses as set forth in FIG. 18.

In the reconstruction of color slow-scan signals, there is the problem of timing discrepancies between the transmitting and receiving terminals. For example, the incoming data rate can be the horizontal TV rate at the transmit end. The receiver then converts the data at its own internally-generated horizontal TV rate. In systems employing the horizontal scan mode, the allowable timing discrepancy for no apparent distortion of the received image has been plus or minus one-half of the horizontal scan period of real-time video (31.75 microseconds for monochrome systems). This tolerance must be held for one full transmission time of 512 scan lines at 16.67 ms/line (the example assumes 512 pixels horizontal memory size). The accuracy required is thus ±0.00034%. If, on the other hand, the receiving terminal can be caused to re-time its conversion rate to the incoming signal once per received line, the tolerance becomes ±31.75 us per 16.67 ms or ±0.19%, an improvement of tolerance by a factor of 512.

Such an improvement results in a receiving terminal operating at normal rates (i.e., at a 60 Hz vertical scan rate) being able to receive signals from stations transmitting at rates 60.11 Hz to 59.89 Hz with no apparent change in received image. For color-rate systems, the same improvement is obtained. The range of allowable frequency difference in fact allows communication between terminals operating on mixtures of color and monochrome rates.

In order to implement the foregoing in this invention, the incoming data at the receiver is sampled by a horizontal-rate clock which is phase-locked to the incoming data, stored until it can be placed into the receiver's memory, and then written into the memory by the receiver's internal timing pulses.

In the case of a color-rate system, the phase-locked clock is obtained by dividing the internal 14.31818 MHz high frequency clock signal first by 14 to provide a 1.023 MHz clock, and then coupling the 1.023 MHz clock to divide-by-N circuit 132 where the signal is divided by 65 to produce the horizontal-rate clock that is then coupled to A/D convertor 102 (as a pseudo horizontal input to the convert input) as shown in FIG. 17. Modulo-65 divider 132 is reset by each detected line-synchronizing pulse from the received signal, resulting in a horizontal-rate clock locked in phase to the incoming line sync to within one cycle of the 1.023 MHz clock signal.

This horizontal-rate signal clocks A/D converter 102 to digitize the incoming compressed video signal. A 6 bit digitized signal is coupled from A/D converter 102 to first-in first-out (FIFO) memory 128, the signal being clocked in by the end-of-convert (EOC) signal of A/D converter 102. While 6 bit data has been indicated with respect to FIGS. 15-17, it is to be realized that other suitable data bits, such as, for example, 4, 8 or 10 bit data, could be utilized.

When data is available at the output of FIFO memory 128, the receiver's internal horizontal timing is allowed to generate a memory cycle request from flip-flop 134, as indicated in FIG. 17, to write the information into the memory. When this cycle has occurred, signalled by the end of an output enable (OE) pulse, a shift out signal from pulse generator 136 is sent to FIFO memory 128, discarding the now written information and allowing the next information to appear on the output. This sequence of convert-FIFO-WRITE is repeated until the next line sync appears, resetting the divider, FIFO memory, and cycle request. For this purpose, an illustrative timing sequence is shown in FIG. 18.

The start signal from frame start detector 106 (FIG. 15) is used to initiate the write into memory timing sequence at receive enable 140 (as shown in FIG. 19) of slow scan timing generator 110 (as shown in FIG. 15).

The color slow-scan signal contains two widths of line sync (alternate short and long) which is fed to line sync width detector 142 that will not pass the line sync unless each two successive portions are of different widths. This provides further noise immunity to the timing circuits by not allowing most noise pulses to be interpreted as line sync pulses. Also, the width of the line sync pulses are associated with specific horizontal addresses, i.e., short line sync pulses cause the following data to be written into the horizontal address locations—1, 3, 5, 7, etc., while long line sync pulses cause the following data to be written into horizontal address locations—2, 4, 6, 8, 10, etc. This provides additional insurance against improper addressing of the video information and the resulting color shifts that might otherwise occur.

The line sync pulses passed by line sync width detector 142 are then fed to horizontal address counters 144 which increment the horizontal address each time a line sync pulse is received. When all 512 horizontal addresses have been stepped through (signifying that a complete picture has been received), the write-into-memory sequence is terminated.

Between line sync pulses, the cycle request pulse (which occurs when the previously discussed FIFO memory 128 has data ready) is gated with horizontal drive and a fast scan priority signal (signifying that the memory is not busy reading out the data) at memory write timing 146 to create the write command to the memory. The write command is also used to increment the vertical address counters 148 to place the video information into the proper vertical address. This enters the data in the same orthogonal (top to bottom) addressing method as employed in the transmitter where it generates the color slow-scan signal. The next line sync pulse resets this procedure which is then repeated until the write-into-memory sequence is terminated, at which time all timing is terminated also. Output drivers 150 and 152 buffer the horizontal and vertical addresses and write command signals as well as driving the memory.

By changing the timing signals used to A/D convert the color slow-scan signal and to create the write-into-memory addresses, the variable rates as discussed previously in the transmitter description can be matched. Also, by switching horizontal address counters 144 and vertical address counters 148 to proper sequences, the selectable addressing feature (partial pictures), as discussed previously in the transmitter description, can be matched.

All internal timing signals created in the color slow-scan receiver are determined from internal TV sync generator 156 (as shown in FIG. 20) of sync generator 114 (as shown in FIG. 15). There are two options with the sync generator: 1. timing is derived from its own crystal oscillator 158; or 2. the sync generator is gen locked to an external TV sync source.

The incoming sync source is fed through a sync stripper 160 to allow the use of either a composite video signal or a sync pulse source. Out of sync stripper 160, horizontal drive is converted to a ramp signal at horizontal ramp 162 with the ramp signal being fed to a sample and hold circuit 164 where the ramp signal is sampled with horizontal drive from sync generator 156. This produces an error correction voltage which is coupled to sync generator oscillator 166 to lock sync generator oscillator 166 to the proper frequency multiple of incoming horizontal drive necessary for the sync generator to produce horizontal sync at the exact frequency of the incoming horizontal sync.

The vertical drive from sync stripper 160 is coupled to signal presence detector 168. If vertical drive is not sensed to be present (no incoming sync signal), crystal oscillator 158 is automatically switched in by oscillator selector 170. If vertical sync is present, a vertical reset pulse is generated by vertical reset pulse generator 172 which locks sync generator 156 (both vertically and horizontally) in phase with the incoming sync signal.

Since the output horizontal pulse width of the sync generator is not accurate enough to use for the color slows-can timing, the width is reclocked to that of sync generator 156 by horizontal drive width reclocker 174.

Digital memory 108 is "read" by generating the read address signals in such a manner that the stored data comes out at standard television rates. The high speed clock that determines the horizontal addresses (or picture element location along a TV line) is very critical for color TV. While the frequency may vary slightly and still allow the chroma oscillator in TV sets to track the chroma reference, the number of picture elements between the trailing edge of horizontal sync and the next leading edge of horizontal sync must be exactly the same as the slow-scan transmitter (512 in this case). One pulse too many or too few will cause a left-to-right color hue shift in the TV receiver. A count-locked oscillator is employed to achieve this feature.

The reclocked horizontal sync pulse (from reclocker 174 as shown in FIG. 20) is used to gate off oscillator 178 (as shown in FIG. 21) of fast-scan timing generator 112 (as shown in FIG. 15) during its pulse width. When the oscillator starts running, its output is coupled to horizontal address counters 180 which form the horizontal read addresses. The addresses and reclocked horizontal sync are fed to a pulse coincidence detector 182 which generates error pulses, indicating the count reached its maximum too early or too late. These error pulses are coupled to positive and negative current generators 184 and 186 which charge or discharge a capacitor in integrating cirucit 188. The output of integrator 188 is the control voltage for oscillator 178 and is continually corrected by the error currents to ensure that the number of picture elements between the horizontal sync pulses remains constant.

Horizontal sync is also coupled to vertical address counters 190 which generate the vertical read addresses (or line addresses). The horizontal and vertical address outputs are buffered out to the memory through buffers 192 and 194, respectively.

The digital data from memory 108 is converted to analog data at D/A converter 116. As shown in FIG. 22, the signal from D/A converter 116 is coupled to two circuits that separately process the luminance and chroma. The luminance circuit removes the 3.58 MHz chroma and blanks the luminance at 3.58 MHz trap and blanking circuit 198, with luminance blanking signals coupled to circuit 198 being generated at chroma and luminance blanking generator 200.

A 3.58 MHz passband and blanking circuit 202 separates the chroma from the luminance portion of the signal, with the chroma blanking signal (from chroma and luminance blanking generator 200) being used to blank the chroma signal at 3.58 MHz passband and blanking circuit 202. The output from circuit 202 is coupled to both the inverting and non-inverting inputs of analog multiplexer 204. Multiplexer 204 is switched every other frame with a signal generated by dividing the field by two at divide by two circuit 206. This gives a frame by frame alternating color subcarrier phase as in the NTSC standard video signal.

The luminance and chroma signals are then mixed together at mixer 208 and coupled to sync adder 210. A second input to sync adder 210 is provided by coposite sync from the sync generator delayed at sync delay 212 to match the delays to the video signal caused by signal processing in both the transmitter and the receiver. The resulting sync from sync delay 212 is then added to the video output at sync adder 210.

In operation, the color TV picture to be transmitted (i.e., the color TV picture constructed from the color video input) is viewed on color TV monitor 29. When the operator is satisfied with the picture, the picture is digitized in video compressor 25 and a slow-scan analog signal formed for the transmission through transmission channel 31 to video expander 33 where the color slow-scan analog signal is digitized and reconstructed and then viewed on color TV monitor 35.

As can be appreciated from the foregoing, this invention provides a device and method for transmitting and receiving color TV pictures through the use of slow-scan techniques.

What is claimed is:

1. A color slow-scan TV system, comprising:
   a transmitter having first memory means and first and second signal processing means, said first signal processing means being adapted to accept an encoded video input signal having chrominance and luminance components indicative of a color TV picture and digitizing the same, with said digitized signal being written into said first memory means, and said digitized signal being read out of said memory means by said second processing means in an orthogonal manner as a color slow-scan analog signal for transmission; and
   a receiver having second memory means and third and fourth signal processing means, said third signal processing means being adapted to accept said color slow-scan analog signal transmitted by said transmitter and digitizing the same, with said digitized signal being written into said second memory means is an orthogonal manner, and said digitized signal being read out of said second memory means by said fourth processing means to reconstruct said color TV picture for display.

2. The system of claim 1 wherein said first signal processing means includes means to freeze a selected color TV picture and digitizing the video signal indicative thereof, and wherein said fourth processing means reconstructs said selected color TV picture for display.

3. The system of claim 2 wherein said first signal processing means includes logic means to select a specific color burst phase when freezing said selected color TV picture.

4. The system of claim 1 wherein said transmitter includes timing means providing a high frequency phase-locked clock to control timing of said first memory means.

5. The system of claim 4 wherein said timing means is connected with said first signal processing means to accept said video input signal whereby said clock is synchronized with the timing of said video input signal.

6. The system of claim 1 wherein said second processing means of said transmitter includes selectable addressing means for enabling transmission of selected portions of said digitized signal in said first memory means.

7. The system of claim 6 wherein said selectable addressing means includes means for causing transmission of a reference color burst with respect to said color TV picture.

8. The system of claim 1 wherein said second processing means includes means for varying the speed of readout of said first memory means.

9. The system of claim 1 wherein said receiver includes timing means for providing write-in and read-out speeds with said read-out speed being faster than said write-in speed, with said timing means being responsive to said color slow-scan analog signal received at said receiver for controlling the write-in timing of said second memory means.

10. The system of claim 9 wherein said timing means includes means for detection of line sync and frame start components included in color slow-scan analog signals received at said receiver.

11. The system of claim 1 wherein said third processing means of said receiver includes an analog-to-digital converter, and means for providing a pseudo convert input to said analog-to-digital converter for controlling timing of the input of said color slow-scan signal thereto.

12. The system of claim 1 wherein said third signal processing means of said receiver includes filter means for filtering of the chroma subcarrier component of said analog signal indicative of a color TV picture prior to writing said digitized signal into said second memory means.

13. The system of claim 1 wherein said receiver includes a sync generator that is phase-lockable with respect to said receiver color slow-scan signal.

14. The system of claim 13 wherein said fourth processing means of said receiver includes clock generating means connected with said sync generator, said fourth processing means also including means for automatically correcting the frequency of said clock generating means.

15. The system of claim 1 wherein said fourth processing means of said receiver includes selectable addressing means for selective read-out of said second memory means for enabling selective up-dating of a displayed color TV picture.

16. The system of claim 1 wherein said system includes a transmission channel between said transmitter and said receiver, with said transmission channel being one of a standard voice grade telephone line, a dedicated telephone line, a satellite channel, and a tape recorder.

17. The system of claim 16 wherein said system includes a transceiver at each end of said transmission channel for effecting transmission in opposite directions through said transmission channel.

18. A color slow-scan TV system, comprising:
video compressor means including first means for receiving a composite video input signal having chrominance and luminance components indicative of NTSC color TV picture information and digitizing the same, first digital memory means for accepting said digitized information from said first means and storing the same, and second means for accepting said digitized information stored in said first digital memory means with said digitized information being read out of said first digital memory means in an orthogonal manner to form therefrom a slow-scan TV analog output signal that includes both the luminance and chroma portions of said color TV picture information, said slow-scan output signal being adapted for transmission on a transmission channel; and
video expander means including third means for receiving transmitted slow-scan signals indicative of color TV picture information from said video compressor means and digitizing the same, second digital memory means for accepting said digitized information from said third means and storing the same, and fourth means for reading out said digitized information from said second digital memory means at high speed and reconstructing therefrom said NTSC color TV picture information with said information being adapted to be displayed on a color TV monitor.

19. The system of claim 18 wherein said first means of said video compressor means include video processing means adapted to receive said video input signal, sync generator means connected with said video processing means and also connected to accept said video input signal, and analog-to-digital converting means connected with said processing means, wherein said system also includes memory timing means connected with said sync generating means and said first digital memory means, and wherein said second means includes color slow-scan digital-to-analog converting means connected to accept said digital information stored at said first digitial memory means, and slow-scan timing means connected with said sync generator means.

20. The system of claim 19 wherein said sync generator means includes burst-locked oscillator means connected to accept said video input signal.

21. The system of claim 20 wherein said burst-locked oscillator provides an output signal at a frequency of 3.57954 MHz, and wherein said burst-locked oscillator is connected with a times 4 multiplier to provide an output clock frequency of 14.31818 MHz.

22. The system of claim 18 wherein said third means of said video expander means includes analog-to-digital converting means connected to accept said color slow-scan analog signal, wherein said fourth means of said video expander means includes digital-to-analog converting means connected with said second digital memory means, and wherein said system includes timing means including sync generating means, slow-scan timing means connected with said analog-to-digital converting means, said second digital memory means and said sync generating means, and fast-scan timing means connected with said digital-to-analog converting means, said second digital memory means and said sync generating means.

23. The system of claim 22 wherein said timing means includes line sync detecting means and frame start detecting means connected to accept said color slow-scan analog signal and providing an output to said slow-scan timing means.

24. The system of claim 22 wherein said timing means includes means for providing a pseudo-horizontal output to said analog-to-digital converting means.

25. The system of claim 22 wherein said slow-scan timing means includes horizontal and vertical address counters and a line sync width detector connected with said horizontal address counters to provide noise immunity.

26. The system of claim 22 wherein said sync generating means includes a sync generator, a crystal oscillator, an oscillator connected to accept an external sync input, and an oscillator selector means for selecting one of said crystal oscillator and said oscillator connected to accept said external sync input.

27. The system of claim 22 wherein said fast-scan timing means includes input means for providing a horizontal sync input, an oscillator connected with said input means, horizontal address counters, pulse coincidence detector connected with said horizontal address counters, and said input means, plus and minus error current generator means connected with said pulse coincidence detector, and integrating means connected with said plus and minus error current generator means with the output of said integrating means being connected with said oscillator to continually correct frequency errors therein.

28. The system of claim 18 wherein said system includes a trap and blanking circuit and a passband and blanking circuit connected with said first means to accept digitized information therefrom, a chroma and luminance blanking generator connected with said trap and blanking circuit and said passband and blanking circuit, an analog multiplexer connected to said passband and blanking circuit, a mixer for receiving the outputs from said trap and blanking means and said analog multiplexer means, and a sync adder for receiving the output of said mixer and delayed composite sync.

29. A color slow-scan TV system, comprising:
transmitter means for receiving an encoder color video input signal indicative of a color TV picture and providing a color slow-scan analog output including luminance and chroma components indicative of said color TV picture, said transmitter means including clock means responsive to said color video input signal to provide a clock output that is phase-locked to said color video input signal, with said clock output controlling generation of said color slow-scan analog output; and receiver means for receiving said color slow-scan analog output from said transmitter means and providing a fast-scan output indicative of said color video input to said transmitter means, said receiver means including timing means for controlling generation of said fast-scan output so that said output is suitable for display of said color TV picture.

30. The system of claim 29 wherein said transmitter means includes means for digitizing said color video input signal, and memory means for storing said digitized signal, said color slow-scan output analog signal being formed from said digitized signal stored in said memory means.

31. The system of claim 29 wherein said receiver means includes means for digitizing said color slow-scan analog output, and memory means for storing said digitized signal, said color TV picture being formed from said digitized signal stored in said memory means.

32. The system of claim 29 wherein said clock means is a high frequency phase-locked clock providing an output frequency of 14.31818 MHz.

33. A color slow-scan TV system, comprising:
first input means for accepting a composite video input signal having chrominance and luminance components indicative of a NTSC color TV picture;

first timing means;

video processing means connected with said first input means and with said first timing means whereby an analog signal indicative of a still color TV picture is selected from said received composite video input signal;

first converting means for converting said analog signal to digital form and providing a digital output signal;

first memory means connected with said first converting means and said first timing means for storing said digital output signal from said first converting means;

slow-scan means connected with said first memory means and said first timing means for accepting said digital signals stored at said first memory means and providing therefrom a color slow-scan analog output signal;

means adapting said color slow-scan analog signal for transmission on a transmission channel;

second input means for accepting said color slow-scan analog signal after transmission on a transmission channel;

second timing means;

second converting means for converting said received color slow-scan analog signal to digital form and providing a digital output signal;

second memory means connected with said second converting means and said second timing means for storing said digital output signal from said second converting means;

fast-scan means connected with said second memory means and said second timing means for accepting said digital signal stored at said second timing means and reconstructing therefrom said analog signal indicative of said color TV picture; and display means for displaying said color TV picture.

34. In a color slow-scan TV system, a transmitter comprising:
first signal processing means adapted to accept an encoded video input signal having chrominance and luminance components indicative of a color TV picture and digitizing the same;

memory means connected with said first signal processing means for accepting said digitized signal therefrom; and second processing means connected with said memory means for reading out said memory means as a color slow-scan analog signal for transmission.

35. The transmitter of claim 34 wherein said second processing means includes means for reading out said memory means in an orthogonal manner as a color slow-scan analog signal.

36. The transmitter of claim 34 wherein said first signal processing means includes means to freeze a selected color TV picture and digitizing the video signal indicative thereof.

37. The transmitter of claim 36 wherein said first signal processing means includes logic means to select a specific color burst phase when freezing said selected color TV picture.

38. The transmitter of claim 34 wherein said transmitter includes timing means providing a high frequency phase-locked clock to control timing of said memory means.

39. The transmitter of claim 38 wherein said timing means is connected with said first signal processing means to accept said video input signal whereby said clock is synchronized with the timing of said video input signal.

40. The transmitter of claim 34 wherein said second processing means of said transmitter includes selectable addressing means for enabling transmission of selected portions of said digitized signal in said memory means.

41. The transmitter of claim 40 wherein said selectable addressing means includes means for causing transmission of a reference color burst with respect to said color TV picture.

42. The transmitter of claim 34 wherein said second processing means includes means for varying the speed of readout of said first memory means.

43. The transmitter of claim 34 wherein said first signal processing means of said transmitter includes video processing means adapted to receive said video input signal, sync generator means connected with said video processing means and also connected to accept said video input signal, and analog-to-digital converting means connected with said processing means, wherein said system also includes memory timing means connected with said sync generator means and said memory means, and wherein said second signal processing means includes color slow-scan digital-to-analog converting means connected to accept said digital information stored at said memory means, and slow-scan timing means connected with said sync generator means.

44. The transmitter of claim 43 wherein said sync generator means includes burst-locked oscillator means connected to accept said video input signal.

45. The transmitter of claim 44 wherein said burst-locked oscillator provides an output signal at a frequency of 3.57954 MHz, and wherein said burst-locked oscillator is connected with a times 4 multiplier to provide an output clock frequency of 14.31818 MHz.

46. In a color slow-scan TV system, a receiver comprising:
 first signal processing means adapted to accept color slow-scan analog signals having chrominance and luminance components and digitizing the same;
 memory means connected with said first signal processing means for accepting digitized signals from said first signal processing means; and
 second signal means connected with said memory means for reading out said memory means to reconstruct said color TV picture for display.

47. The receiver of claim 46 wherein said first signal processing means includes means for writing said digitized signals into said memory means in an orthogonal manner.

48. The receiver of claim 46 wherein said receiver includes timing means for providing write-in and read-out speeds with said read-out speed being faster than said write-in speed, with said timing means being responsive to said color slow-scan analog signal received at said receiver for controlling the write-in timing of said memory means.

49. The receiver of claim 48 wherein said timing means includes means for detection of line sync and frame start components included in color slow-scan analog signals received at said receiver.

50. The receiver of claim 46 wherein said first signal processing means of said receiver includes an analog-to-digital converter, and means for providing a pseudo convert input to said analog-to-digital converter for controlling timing of the input of said color slow-scan signal thereto.

51. The receiver of claim 46 wherein said first signal processing means of said receiver includes filter means for filtering of the chroma subcarrier component of said analog signal indicative of a color TV picture prior to writing said digitized signal into said memory means.

52. The receiver of claim 46 wherein said receiver includes a sync generator that is phase-lockable with respect to said received color slow-scan signal.

53. The receiver of claim 52 wherein said second processing means of said receiver includes clock generating means connected with said sync generator, said second processing means also including means for automatically correcting the frequency of said clock generating means.

54. The receiver of claim 46 wherein said second processing means of said receiver includes selectable addressing means for selective read-out of said memory means for enabling selective up-dating of a displayed color TV picture.

55. The receiver of claim 46 wherein said first signal processing means of said transmitter includes analog-to-digital converting means connected to accept said color slow-scan analog signal, wherein said second signal processing means of said receiver includes digital-to-analog converting means connected with said memory means, and wherein said system includes timing means including sync generating means, slow-scan timing means connected with said analog-to-digital converting means, said digital memory means and said sync generating means, and fast-scan timing means connected with said digital-to-analog converting means, said digital memory means and said sync generating means.

56. The receiver of claim 55 wherein said timing means includes line sync detecting means and frame start detecting means connected to accept said color slow-scan analog signal and providing an output to said slow-scan timing means.

57. The receiver of claim 55 wherein said timing means includes means for providing a pseudo-horizontal output to said analog-to-digital converting means.

58. The receiver of claim 55 wherein said slow-scan timing means includes horizontal and vertical address counters and a line sync width detector connected with said horizontal address counters to provide noise immunity.

59. The receiver of claim 55 wherein said sync generating means includes a sync generator, a crystal oscillator, an oscillator connected to accept an external sync input, and an oscillator selector means for selecting one of said crystal oscillator and said oscillator connected to accept said external sync input.

60. The receiver of claim 55 wherein said fast-scan timing means includes input means for providing a horizontal sync input, an oscillator connected with said input means, horizontal address counters, a pulse coincidence detector connected with said horizontal address counters, and said input means, plus and minus error current generator means connected with said pulse coincidence detector, and integrating means connected with said plus and minus error current generator means with the output of said integrating means being connected with said oscillator to continually correct frequency errors therein.

61. The receiver of claim 46 wherein said system includes a trap and blanking circuit and a passband and blanking circuit connected with said first means to accept analog information therefrom, a chroma and luminance blanking generator connected with said trap and blanking circuit and said passband and blanking circuit, an analog multiplexer connected to said passband and blanking circuit, a mixer for receiving the outputs from said trap and blanking means and said analog multiplexer means, and a sync adder for receiving the output of said mixer and delayed composite sync.

62. A method for transmitting and receiving color slow-scan TV signals, said method comprising:

accepting an encoded video signal having chrominance and luminance components indicative of a color TV picture;

digitizing said video input signal and entering said digitized signal into a first memory;

reading out said digitized video signal from said first memory in an orthogonal manner as a color slow-scan analog signal;

transmitting said color slow-scan analog signal;

receiving said color slow-scan analog signal;

digitizing said received color slow-scan analog signal and entering said digitized signal in a second memory; and reading out said digitized signal in said second memory to reconstruct the color TV picture for display.

63. The method of claim 62 wherein said method includes freezing a video input signal indicative of a color TV picture and digitizing said video input signal indicative of said frozen color TV picture.

64. The method of claim 63 wherein said method includes viewing said frozen color TV picture on a monitor prior to forming said color slow-scan analog signal.

65. The method of claim 62 wherein said method includes selecting a specific color burst phase when freezing said video input signal.

66. The method of claim 62 wherein said method includes generating a precise high frequency clock signal for timing digitizing of said video input signal and entering the digitized signal into the first memory and synchronizing said high frequency clock signal with said video input signal.

67. The method of claim 62 wherein said method includes selectably addressing information in said first memory to enable transmission of selected portions of said digitized information in said first memory.

68. The method of claim 62 wherein said method includes reading out the digitized information in said first memory at predetermined different rates to enable varying transmission rates.

69. The method of claim 62 wherein said method includes providing a pseudo convert timing signal to control digitizing of said color slow-scan analog signal.

70. The method of claim 62 wherein said method includes filtering of said digitized information indicative of said color slow-scan analog signal prior to writing said analog information into the second memory.

71. The method of claim 62 wherein said method includes providing a timing signal for controlling digitizing of said color slow-scan analog signal and writing the same into the second memory with said timing signal being phase-lockable with respect to the color slow-scan analog signal.

72. The method of claim 62 wherein said method includes providing a precise clock signal for controlling read-out of said second memory to provide said color TV picture with said clock signal being automatically retained in a phase-locked condition.

73. The method of claim 62 wherein said method includes providing selectable addressing of the second memory to provide selected updating of a displayed color TV picture.

74. A method for transmitting color slow-scan TV signals, said method comprising:

accepting an encoded video input signal having chrominance and luminance components indicative of a color TV picture;

digitizing said video input signal and entering said digitized signal into a memory;

reading out said digitized video signal from said memory as a color slow-scan analog signal; and transmitting said color slow-scan analog signal.

75. A method for receiving color slow-scan TV signals, said method comprising:

receiving a color slow-scan analog signal having chrominance and luminance components indicative of a transmitted color TV picture;

digitizing said received color slow-scan analog signal;

entering said digitized information into a memory; and reading out said digitized information from said memory to reconstruct said color TV picture for display.

* * * * *